(12) United States Patent
Han et al.

(10) Patent No.: US 10,739,907 B2
(45) Date of Patent: Aug. 11, 2020

(54) ELECTRONIC APPARATUS AND OPERATING METHOD OF THE SAME

(71) Applicant: SAMSUNG ELECTRONICS CO., LTD., Suwon-si, Gyeonggi-do (KR)

(72) Inventors: Sangjin Han, Suwon-si (KR); Jeannie Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/242,444

(22) Filed: Jan. 8, 2019

(65) Prior Publication Data

US 2019/0250757 A1    Aug. 15, 2019

(30) Foreign Application Priority Data

Feb. 13, 2018    (KR) .................. 10-2018-0018059

(51) Int. Cl.
| | |
|---|---|
| *G06F 3/041* | (2006.01) |
| *G06F 3/0354* | (2013.01) |
| *G06F 3/0488* | (2013.01) |
| *G06F 3/0484* | (2013.01) |
| *H04N 5/232* | (2006.01) |
| *G06F 9/30* | (2018.01) |

(52) U.S. Cl.
CPC ........ *G06F 3/0416* (2013.01); *G06F 3/03545* (2013.01); *G06F 3/0412* (2013.01); *G06F 3/0488* (2013.01); *G06F 3/04845* (2013.01); *G06F 9/3004* (2013.01); *H04N 5/23216* (2013.01); *H04N 5/23229* (2013.01)

(58) Field of Classification Search
CPC .. G06F 3/0416; G06F 3/03545; G06F 3/0412; G06F 3/04845; G06F 3/0488; G06F 9/3004; H04N 5/23216; H04N 5/23229
See application file for complete search history.

(56) References Cited

U.S. PATENT DOCUMENTS

| | | |
|---|---|---|
| 2013/0332892 A1 | 12/2013 | Matsuki |
| 2014/0002389 A1 | 1/2014 | Kim et al. |
| (Continued) | | |

FOREIGN PATENT DOCUMENTS

| | | |
|---|---|---|
| KR | 10-2014-0009851 | 1/2014 |
| KR | 10-2016-0108732 | 9/2016 |

OTHER PUBLICATIONS

International Search Report and Written Opinion dated Apr. 8, 2019 in counterpart International Patent Application No. PCT/KR2019/000019.

*Primary Examiner* — Peter D McLoone
(74) *Attorney, Agent, or Firm* — Nixon & Vanderhye P.C.

(57) ABSTRACT

Provided are an electronic apparatus and method of operating the electronic apparatus. The electronic apparatus includes a display; a touch input interface comprising touch input interface circuitry; a memory configured to store instructions; and a processor configured to execute instructions stored in the memory, wherein the processor is configured to execute instructions to: control the display to output a screen of an external device to at least a portion of the display by mirroring the external device, recognize the touch input as a drawing input or an external device control input for controlling the external device based on a thickness of the touch input and control the display to output drawing data or control the external device.

20 Claims, 18 Drawing Sheets

(56) References Cited

U.S. PATENT DOCUMENTS

| | | |
|---|---|---|
| 2014/0337720 A1 | 11/2014 | Park et al. |
| 2015/0116248 A1* | 4/2015 | Niwa .................. G06F 3/03545 |
| | | 345/173 |
| 2015/0138385 A1* | 5/2015 | Kim .................. H04N 5/23216 |
| | | 348/211.99 |
| 2017/0223264 A1 | 8/2017 | Jung et al. |
| 2017/0255304 A1 | 9/2017 | Lee et al. |

* cited by examiner

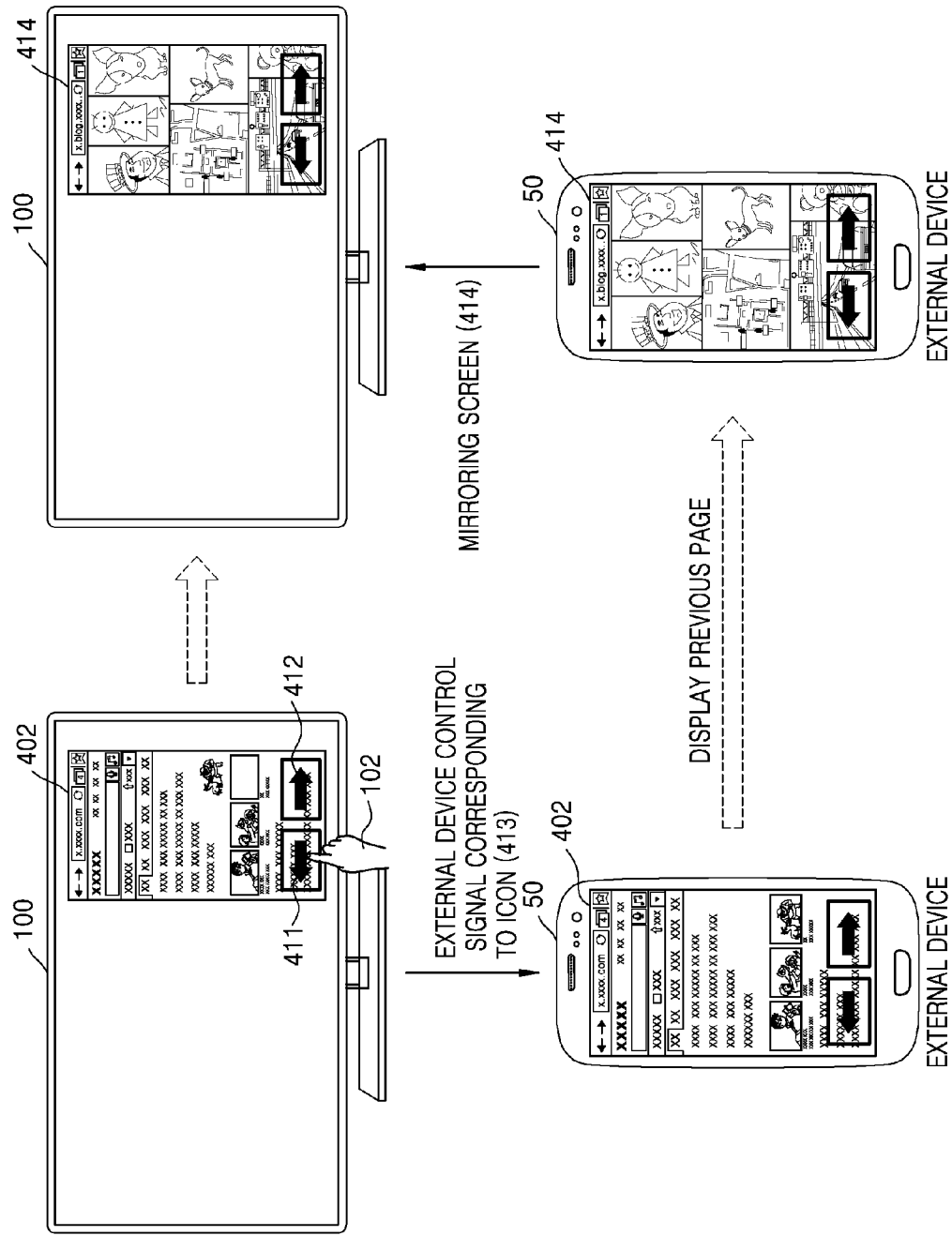

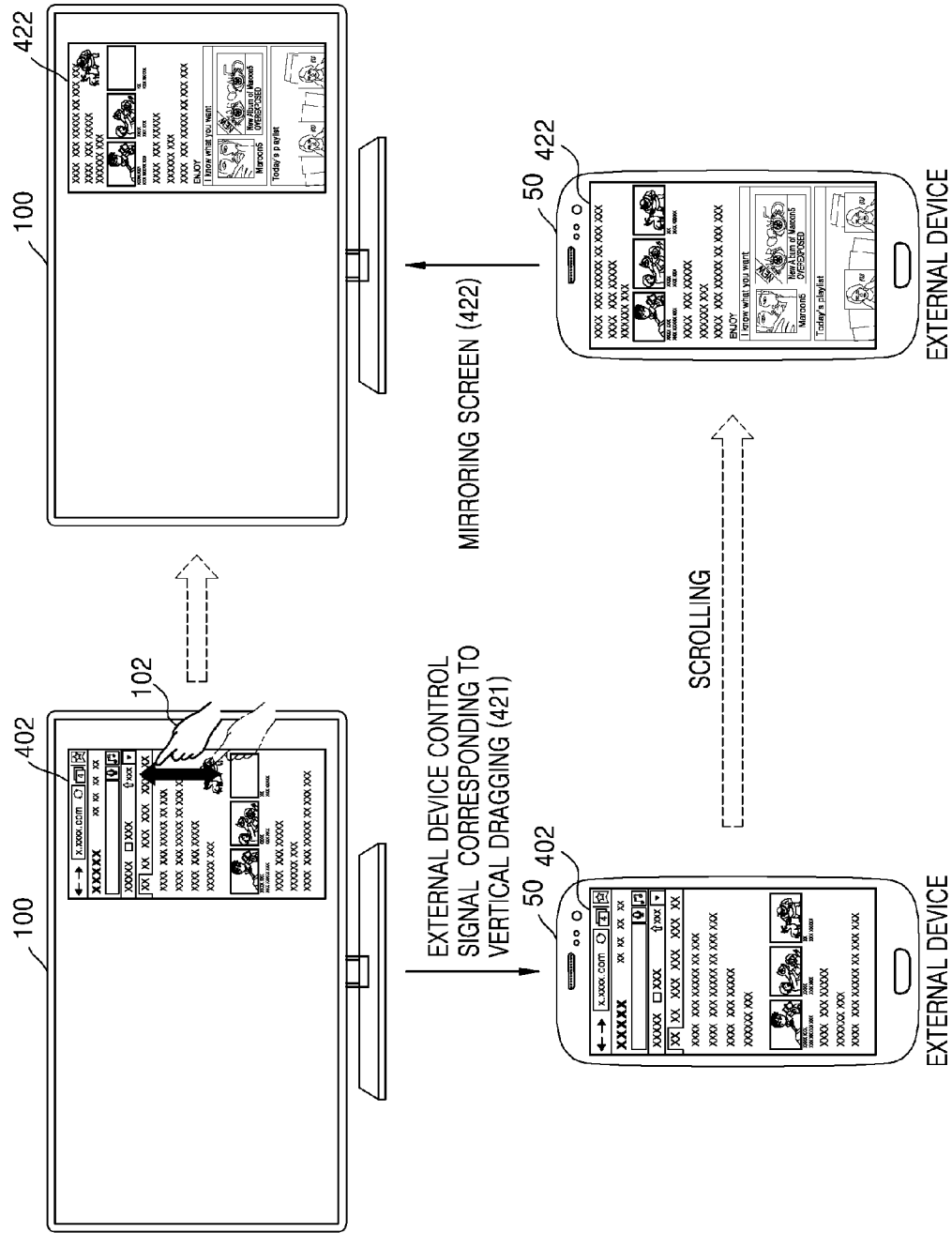

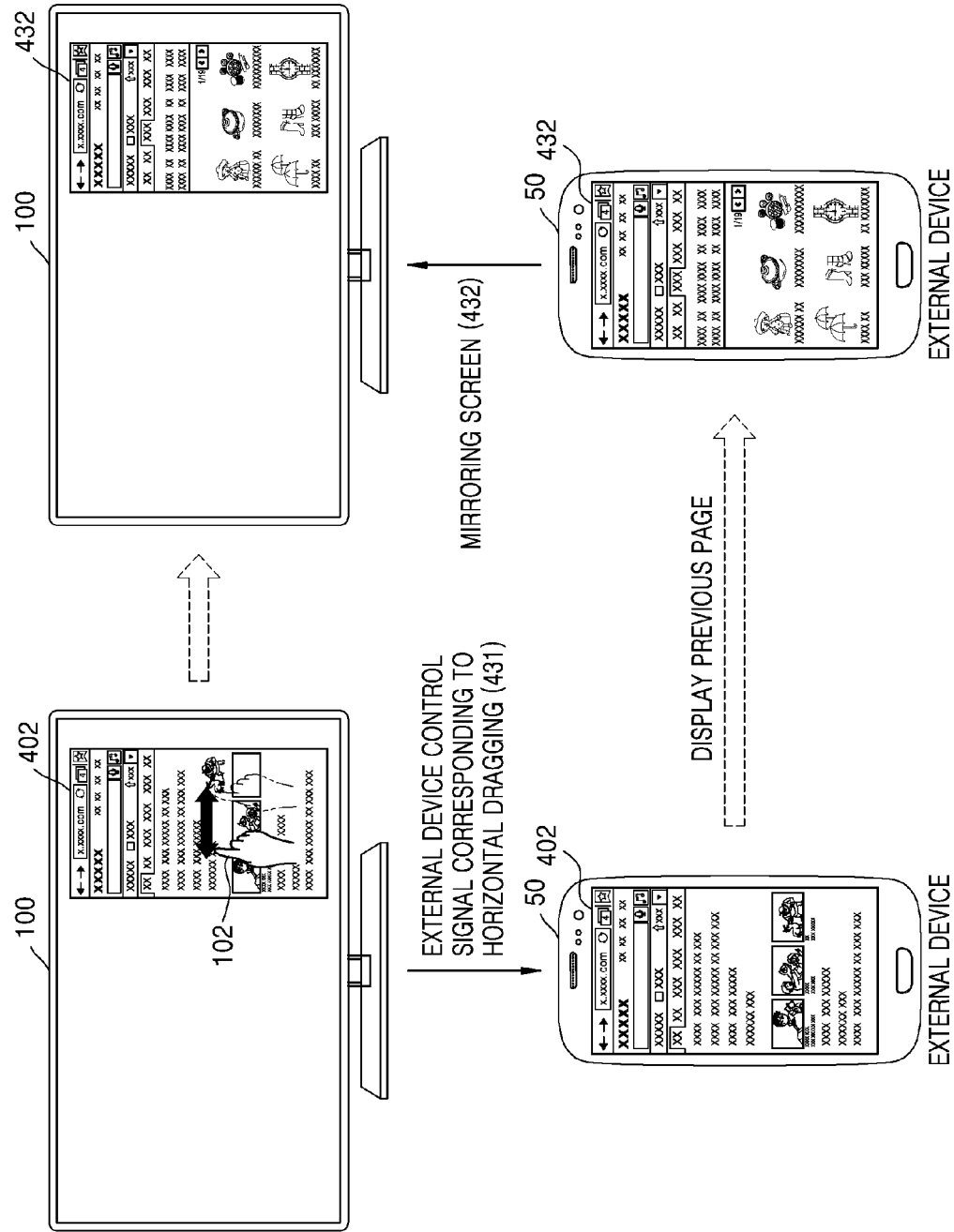

ELECTRONIC APPARATUS AND OPERATING METHOD OF THE SAME

CROSS-REFERENCE TO RELATED APPLICATION

This application is based on and claims priority under 35 U.S.C. § 119 to Korean Patent Application No. 10-2018-0018059, filed on Feb. 13, 2018, in the Korean Intellectual Property Office, the disclosure of which is incorporated by reference herein in its entirety.

BACKGROUND

1. Field

The disclosure relates to an electronic apparatus and an operating method of the electronic apparatus, and, for example, to a method of recognizing a touch input, the method being performed by the electronic apparatus.

2. Description of Related Art

As electronic apparatuses embodied with a touchscreen are widely used, various touch inputs by a user's hand and an electronic pen are applied to the touchscreen. A user may perform, using a touch input, various operations associated with an electronic apparatus, the operations including selecting an icon displayed on a screen of the electronic apparatus, drawing a picture, inputting a letter, or the like. To support a more delicate touch input, various techniques associated with a touch input using an electronic pen are being developed. Due to types of a touch input unit becoming more varied, there is a demand for a method of allowing an electronic apparatus to easily distinguish between different types of touch inputs.

SUMMARY

According to example embodiments of the present disclosure, methods and apparatuses for differently recognizing types of touch inputs based on thicknesses of the received touch inputs, without an additional operation of changing a type of an touch input, and controlling an external device or outputting a drawing input to a display, based on a type of a recognized touch input are provided.

Additional aspects will be set forth in part in the description which follows and, in part, will be apparent from the description.

In accordance with an example aspect of the disclosure, an electronic apparatus includes a display; a touch input interface comprising interface circuitry configured to receive a touch input; a memory configured to store one or more instructions; and a processor configured to execute the one or more instructions stored in the memory, wherein the processor is configured to execute the one or more instructions to: control the display to output a screen of an external device to at least a portion of the display by mirroring the external device, recognize the touch input as one of a drawing input and an external device control input for controlling the external device based on a thickness of the touch input received using the touch input interface via the screen of the external device output to the at least the portion of the display, control the display to output drawing data corresponding to the drawing input, when the touch input is recognized as the drawing input, and control the external device, when the touch input is recognized as the external device control input.

The processor may be further configured to execute the one or more instructions to: measure the thickness of the touch input, recognize the touch input as the drawing input, when the measured thickness of the touch input corresponds to a first threshold range, and recognize the touch input as the external device control input, when the measured thickness of the touch input corresponds to a second threshold range.

The processor may be further configured to execute the one or more instructions to: determine the touch input as one of a touch input by an electronic pen and a touch input by a finger based on the thickness of the touch input, recognize the touch input as the drawing input, when the touch input is determined to be the touch input by the electronic pen, and recognize the touch input as the external device control input, when the touch input is determined to be the touch input by the finger.

The processor may be further configured to execute the one or more instructions to output the drawing data to a region of the display, the region corresponding to the screen of the external device.

The processor may be further configured to execute the one or more instructions to store the drawing data and a captured image of the screen of the external device when the drawing input is completed.

The processor may be further configured to execute the one or more instructions to control the display to move and output the drawing data and the stored captured image in response to an external input of moving the stored captured image.

The processor may be further configured to execute the one or more instructions to control the display to move and output the stored captured image and the drawing data, from among a plurality of items of drawing data output to the display and is positioned in a region of the display, the region corresponding to the screen of the external device.

The processor may be further configured to execute the one or more instructions to: determine, in response to a touch input of touching the drawing input being output to the display, a thickness of the touch input, recognize the touch input as an input of deleting the drawing input when the thickness of the touch input corresponds to a third threshold value, and delete the drawing data, in response to the recognized input.

The processor may be further configured to execute the one or more instructions to: control the display to output the screen of the external device to an entire region of the display, control, when the drawing input is received, the display to display a menu for outputting the screen of the external device to a portion of the display, and control, in response to an input of selecting the menu, the display to decrease and output the screen of the external device from the entire region of the display to the portion of the display.

The processor may be further configured to execute the one or more instructions to recognize, as the input of selecting the menu, a touch input of touching a region displaying the menu of the display using an electronic pen.

In accordance with another aspect of the disclosure, an operating method of an electronic apparatus includes outputting a screen of an external device to at least a portion of a display of the electronic apparatus by mirroring the external device; receiving a touch input via the screen of the external device, the screen being output to the at least the portion of the display; recognizing the touch input as one of a drawing input and an external device control input, based on a thickness of the touch input; outputting drawing data corresponding to the drawing input, when the touch input is recognized as the drawing input; and controlling the external device, when the touch input is recognized as the external device control input.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 4B is a diagram illustrating an example in which the external device is controlled based on a thickness of a touch input, according to another embodiment;

FIG. 4C is a diagram illustrating an example in which the external device is controlled based on a thickness of a touch input, according to another embodiment;

FIG. 4D is a diagram illustrating an example in which the external device is controlled based on a thickness of a touch input, according to another embodiment;

DETAILED DESCRIPTION

Figure 1A:
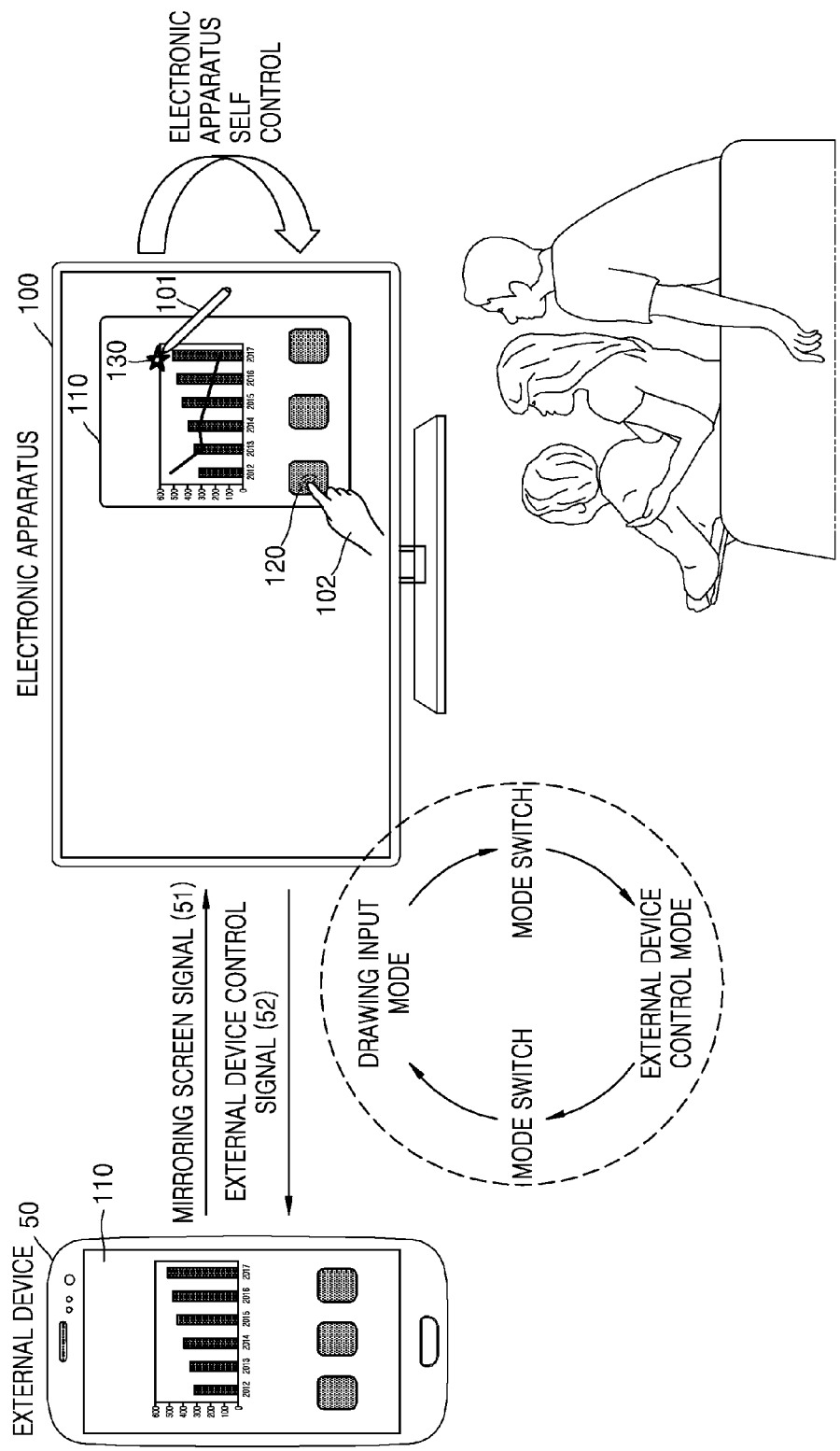
FIG. 1A is a diagram illustrating an electronic apparatus that displays a mirroring screen, according to an embodiment.

The present disclosure will now be described in greater detail with reference to the accompanying drawings. The present disclosure may, however, be embodied in many different forms and should not be understood as being limited to the various example embodiments set forth herein. In addition, portions irrelevant to the description of the present disclosure may be omitted in the drawings for a clear description of the present disclosure, and like reference numerals denote like elements throughout the disclosure.

All terms including descriptive or technical terms which are used herein should be understood as having meanings that are apparent to one of ordinary skill in the art. However, the terms may have different meanings according to an intention of one of ordinary skill in the art, precedent cases, or the appearance of new technologies. Thus, the terms used herein are defined based on the meaning of the terms together with the description throughout the disclosure.

The terms used herein are merely for the purpose of describing various example embodiments and are not intended to limit the scope of the present disclosure. As used herein, the singular forms "a," "an," and "the" may include the plural forms as well, unless the context clearly indicates otherwise. Throughout the disclosure, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

The use of the terms "the" and similar referents in the context of describing the disclosure (especially in the context of the following claims) are to be understood to cover both the singular and the plural. In addition, the steps of all methods described herein can be performed in any suitable order unless otherwise indicated herein or otherwise clearly denoted by context. The present disclosure is not limited by the steps described herein.

The expressions "some embodiments" or "an embodiment" recited throughout the disclosure do not necessarily indicate the same embodiment.

Some embodiments of the present disclosure may be described in terms of functional block components and various processing steps. Some or all of functional blocks may be realized by any number of hardware and/or software components configured to perform the specified functions. For example, the functional blocks of the present disclosure may employ various integrated circuit components which may carry out a variety of functions under the control of one or more microprocessors. In addition, for example, the functional blocks of the present disclosure may be implemented using any programming or scripting language. The functional blocks may be implemented in algorithms that execute on one or more processors. Furthermore, the present disclosure could employ any number of techniques according to the related art for electronics configuration, signal processing and/or control, data processing and the like. The words "mechanism", "element", "means", and "configuration" are used broadly and are not limited to mechanical or physical embodiments, but can include software routines in conjunction with processors, or the like.

Furthermore, the connecting lines, or connectors shown in the various drawings presented are intended to represent example functional relationships and/or physical or logical couplings between the various elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Reference will now be made in greater detail to various embodiments, examples of which are illustrated in the accompanying drawings.

FIG. 1 is a diagram illustrating an electronic apparatus 100 that displays a mirroring screen 110, according to an embodiment.

Referring to FIG. 1A, the electronic apparatus 100 may be an electronic board but is not limited thereto and may be embodied as an electronic apparatus including a display. For example, and without limitation, the electronic apparatus 100 may be embodied as one of various electronic apparatuses including a television (TV), a mobile phone, a tablet personal computer (PC), a digital camera, a camcorder, a laptop computer, a PC, a desktop computer, an electronic book (e-book) terminal, a terminal for digital broadcasting, a personal digital assistant (PDA), a portable multimedia player (PMP), navigation, an MP3 player, a wearable device, or the like. The electronic apparatus 100 may be fixed or portable, and may be a digital broadcasting receiver configured to receive digital broadcasting.

The electronic apparatus 100 may be embodied as not only a flat display apparatus but also embodied as a curved display apparatus whose screen is curved with a curvature or a flexible display apparatus whose curvature is adjustable. Output definition of the electronic apparatus 100 may be a high-definition (HD) class, a full HD class, an ultra HD class, or a definition class more clear than the ultra HD class.

When the electronic apparatus 100 is embodied with a touchscreen, the electronic apparatus 100 may be controlled based on a touch input by an electronic pen 101 or a user's hand. The electronic apparatus 100 may receive a drawing input from the electronic pen 101 or a finger, and may output the received drawing input to the display of the electronic apparatus 100. The drawing input may include, on the display, an input of placing a point using the electronic pen 101 or a finger, an input of drawing a shape indicating a certain trace, and an input of writing a letter, but is not limited to. Also, the electronic apparatus 100 may delete the drawing input output to the display, in response to a touch input by the electronic pen 101 or the finger.

Throughout the disclosure, the term "user" may, for example, and without limitation, indicate a person who controls a function or an operation of the electronic apparatus 100, and may include a viewer, a manager, or an installation engineer.

The electronic apparatus 100 according to an embodiment may output a screen 110 (also referred to as the mirroring screen 110) of an external device 50 to the display of the electronic apparatus 100 by mirroring the external device 50. For example, referring to FIG. 1A, a user attempts to output, to the display of the electronic apparatus 100, meeting information stored in the external device 50 so as to conduct a meeting using the electronic apparatus 100 whose screen size is larger than that of the external device 50. When the meeting information is output on the screen 110 of the external device 50, the electronic apparatus 100 may output the screen 110 of the external device 50 to the display of the electronic apparatus 100 by receiving a mirroring screen signal 51 from the external device 50. The screen 110 of the external device 50 may be output to at least a portion of the display of the electronic apparatus 100. In this regard, the screen 110 of the external device 50 which is output to at least a portion of the display of the electronic apparatus 100 may include, but is not limited to, one or more icons 120 for controlling the external device 50 and the meeting information executed by the external device 50.

When the screen 110 of the external device 50 is output to at least a portion of the display of the electronic apparatus 100, the electronic apparatus 100 may receive, via the electronic pen 101 or a finger 102 of a user, a touch input to a mirroring screen of the external device 50 which is output to at least the portion of the display. In this regard, the received touch input may include an input of selecting a certain icon or a drawing input.

For example, as illustrated in FIG. 1A, when the screen 110 of the external device 50 which displays the meeting information is output to the display of the electronic apparatus 100, the user may, on the display of the electronic apparatus 100, input texts related to the meeting information or mark a highlight on the meeting information. Also, the electronic apparatus 100 may receive an input of touching an icon 120 from among the one or more icons 120 positioned at the screen 110 of the external device 50, and may control the external device 50 to perform an operation associated with the touched icon 120, in response to the received input.

However, in order for the electronic apparatus 100 to distinguish between the input of selecting an icon and the drawing input, there may be a need for an additional input for changing a type of a touch input (e.g., an operation of selecting a menu for changing the input of selecting an icon to the drawing input). For example, according to the related art, when the electronic apparatus 100 operates in a drawing input mode, the electronic apparatus 100 has to switch its mode to operate in an external device control mode. Also, when the electronic apparatus 100 operates in the external device control mode, the electronic apparatus 100 has to switch again its mode to operate in the drawing input mode. In this case, the input for changing a type of a touch input has to be repeatedly performed, such that it may not be efficient for the user. Therefore, in order for the user to easily control the external device 50 on the display of the electronic apparatus 100, there is a demand for a method, performed by the electronic apparatus 100, of automatically recognizing an input of controlling an external device and a drawing input.

Figure 1B:
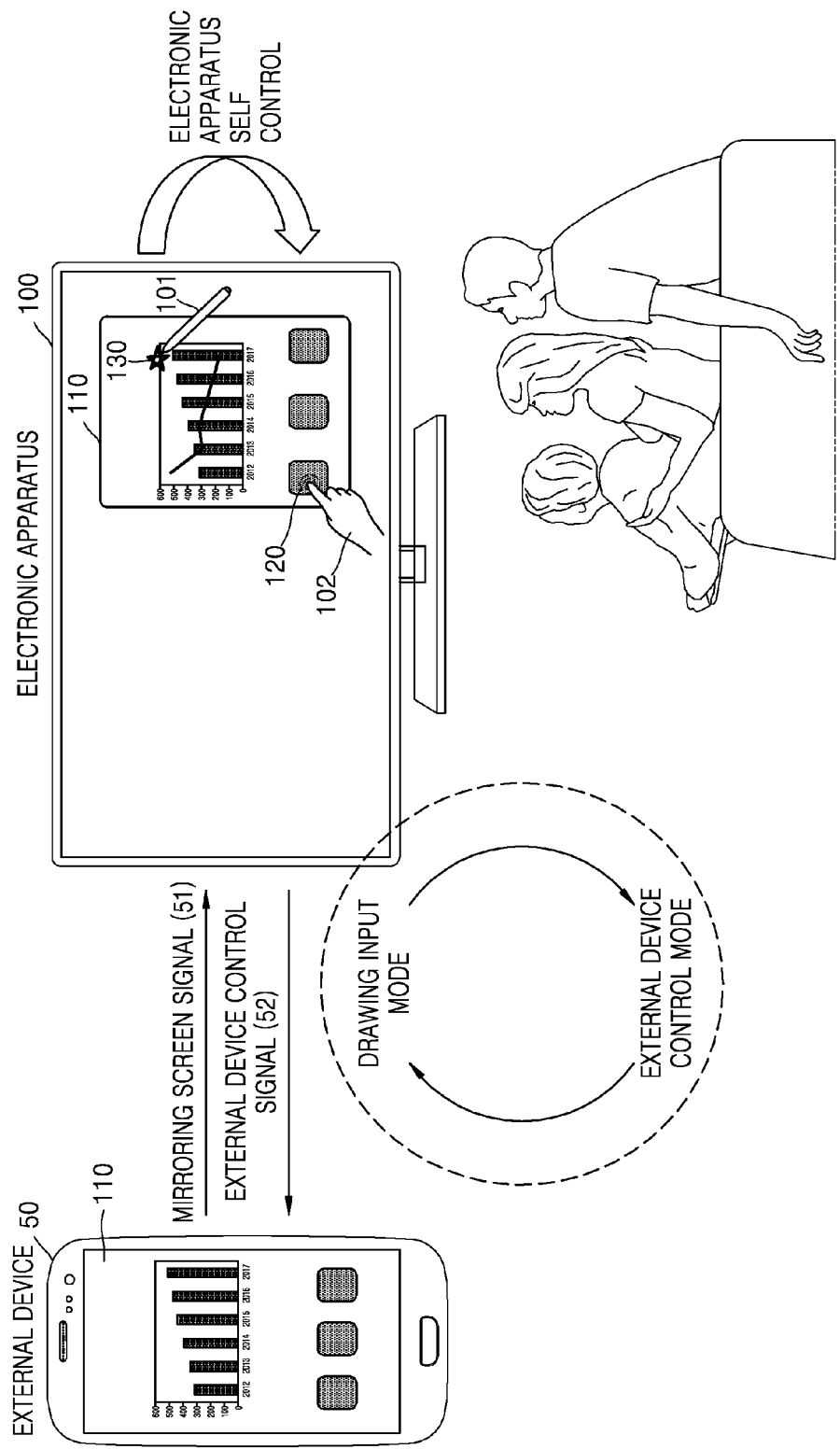
FIG. 1B is a diagram illustrating a system of the electronic apparatus, according to an embodiment.

FIG. 1B is a diagram illustrating a system of the electronic apparatus 100, according to an embodiment.

Referring to FIG. 1B, the electronic apparatus 100 according to an embodiment may receive the mirroring screen signal 51 from the external device 50 and may display the mirroring screen 110 on the display. The mirroring screen 110 may be displayed on at least a portion or an entire region of the display of the electronic apparatus 100.

When the electronic apparatus 100 detects a touch input by a user with respect to the mirroring screen 110 displayed on at least the portion of the display, the electronic apparatus 100 may determine a thickness of the touch input. The electronic apparatus 100 may differently (selectively) determine a type of the touch input based on the thickness of the touch input. For example, the electronic apparatus 100 may recognize the touch input as a drawing input or an external device control input, based on the thickness of the touch input.

In a case where the electronic apparatus 100 recognizes the touch input as the drawing input based on the thickness of the touch input, the electronic apparatus 100 may control the electronic apparatus 100 itself to output to the display of the electronic apparatus 100, drawing data corresponding to the drawing input in response to the touch input. Referring to FIG. 1B, when the user performs a touch input according to a trace indicating a star shape using the electronic pen 101, the electronic apparatus 100 may recognize the touch input as a drawing input according to a thickness of the touch input, and may output drawing data 130 in response to the drawing input. For example, in a case where the electronic apparatus 100 recognizes the touch input as the drawing input, the electronic apparatus 100 controls the electronic apparatus 100 itself based on the touch input, and the touch input is not used in controlling the external device 50. The external device may, for example, and without limitation, be a mobile device.

In a case where the electronic apparatus 100 recognizes the touch input as an external device control input based on a thickness of the touch input, the electronic apparatus 100 may perform an external device control corresponding to the touch input. Referring to FIG. 1B, in a case where the user performs the touch input of selecting the icon 120 using the finger 102, the electronic apparatus 100 may recognize the touch input as the external device control input based on the thickness of the touch input, may generate an external device control signal 52 corresponding to the touch input, and may transmit the external device control signal 52 to the external device 50. Upon receipt of the external device control signal 52, the external device 50 may perform a control function corresponding to the external device control signal 52 and may switch its current screen to a screen corresponding to the performed control function. Because the external device 50 and the electronic apparatus 100 are in a mirroring state, the electronic apparatus 100 may receive and display a screen changed in response to the performed control function. Thus, the electronic apparatus 100 may receive, from the external device 50, and display a screen that corresponds to a function performed in response to selection of the icon 120.

The external device control may be implemented in various manners. The external device 50 and the electronic apparatus 100 are in the mirroring state, and in the mirroring state, the electronic apparatus 100 may transmit a control signal to the external device 50 to perform all control functions that may be performed in the external device 50. Thus, the user may control the external device 50 by performing all control operations via the electronic apparatus 100 displaying a mirroring screen, wherein all control operations may be performed on the external device 50 by the user using a certain input unit or a user's finger. For example, the external device control may include a control corresponding, for example, and without limitation, to selection of an icon, a control corresponding to page scrolling, a control corresponding to a switch to an adjacent page such as a next or previous page, or the like.

Thus, as illustrated in FIG. 1B, a switching operation may be automatically performed between a drawing input mode and an external device mode based on a thickness of a touch input, such that an additional mode switching process may be removed.

In this manner, when a touch input is received via a mirroring screen displayed on the electronic apparatus 100, the touch input may be automatically recognized as a drawing input or an external device control input based on a thickness of the touch input, such that the electronic apparatus 100 does not request a user to manually press a separate hardware button to distinguish between the drawing input and the external device control input or does not request a separate interface, therefore, convenience of the user using the mirroring screen may be increased.

Figure 2A:
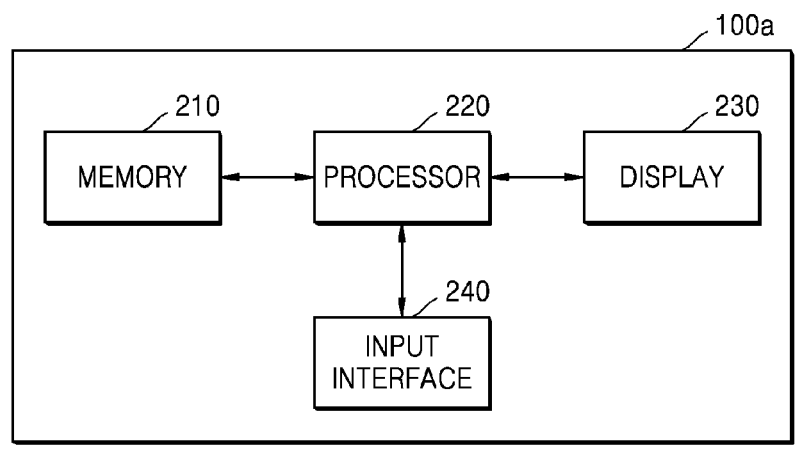
FIG. 2A is a block diagram illustrating an example configuration of an electronic apparatus according to an embodiment.

FIG. 2A is a block diagram illustrating an example configuration of an electronic apparatus 100*a* according to an embodiment.

The electronic apparatus 100*a* illustrated in FIG. 2A may be an example of the electronic apparatus 100 illustrated in FIG. 1B. Referring to FIG. 2A, the electronic apparatus 100*a* according to an embodiment may include a memory 210, a processor (e.g., including processing circuitry) 220, a display 230, and an input interface (e.g., including input interface circuitry) 240. However, the electronic apparatus 100*a* may be embodied with more elements than the shown elements and is not limited thereto.

Hereinafter, the elements are described in greater detail below.

The memory 210 according to an embodiment may store a program for processing and controlling the processor 220, and may store data input to or output from the electronic apparatus 100*a*.

The memory 210 may include, for example, and without limitation, at least one of storage mediums including a flash memory type storage medium, a hard disk type storage medium, a multimedia card micro type storage medium, a card-type memory (e.g., a secure digital (SD) memory, an xD memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disc, an optical disc, or the like.

The memory 210 according to an embodiment may include a module including one or more instructions to output a screen of an external device to at least a portion of the display 230 by mirroring the external device, to recognize a touch input as a drawing input or an external device control input based on a thickness of the touch input received via the screen of the external device which is output to at least the portion of the display 230, and to control the external device in response to the external device control input or to control the display 230 to output drawing data corresponding to the drawing input.

The processor 220 according to an embodiment may include various processing circuitry and controls all operations of the electronic apparatus 100*a*. For example, the processor 220 may execute the one or more instructions, which are stored in the memory 210, to control the display 230 and to perform functions of the electronic apparatuses 100 and 100*a* illustrated in FIG. 1B to 12.

The processor 220 according to an embodiment controls the display 230 to output the screen of the external device to at least the portion of the display 230 by mirroring the external device.

Mirroring may refer, for example, to a method of outputting a screen of an external device to the display 230 of the electronic apparatus 100*a* and controlling the external device using the electronic apparatus 100*a*, while the electronic apparatus 100*a* are the external device are connected in a wireless or wired manner. In response to an input of controlling the external device via the screen of the external device output to the display 230, the input being received from a user, the external device may be controlled.

The processor 220 according to an embodiment may recognize a touch input as a drawing input or an external device control input, based on a thickness of the touch input received via a mirroring screen, for example, the screen of the external device which is output to at least a portion of the display 230.

The touch input may include, but is not limited to, an input by a user's hand and/or an input by the electronic pen 101. For example, the input by the user's hand may include, but is not limited to, an input by the finger 102, an input by a palm, or the like.

The thickness of the touch input may refer, for example, to an area of a touched region when the touch input is an input of touching one place of the display 230. Also, when the touch input is an input of drawing a certain trace on the display 230, the thickness of the touch input may refer to a thickness of a line indicating the drawn trace.

The drawing input may, for example, generally require a relatively delicate input compared to an input of selecting an icon, therefore, a thickness of the drawing input may be relatively less than a thickness of the input of selecting an icon. The processor 220 according to an embodiment may recognize a touch input as the drawing input or an external device control input, based on a thickness of the touch input, thereby automatically recognizing a type of the touch input, without an additional input for changing a type of the touch input.

The processor 220 according to an embodiment may measure a thickness of the received touch input, and when the measured thickness of the touch input corresponds to a first threshold range, the processor 220 may recognize the touch input as the drawing input. Also, when the measured thickness of the touch input corresponds to a second threshold range, the processor 220 may recognize the touch input as the external device control input. For example, and without limitation, when the thickness of the touch input is between about 0 mm and about 3 mm, the processor 220 may recognize the touch input as the drawing input, and when the thickness of the touch input is greater than 3 mm, the processor 220 may recognize the touch input as the external device control input, but the present disclosure is not limited thereto. The first threshold range and the second threshold range may, for example, and without limitation, vary according to internal settings of the electronic apparatus 100*a* or may vary according to settings by a user.

Also, the processor 220 according to an embodiment may determine the touch input as a touch input by the electronic pen 101 or a touch input by the finger 102, based on the thickness of the touch input. For example, a thickness of the touch input by the finger 102 may be greater than a thickness of the touch input by the electronic pen 101. Accordingly, the processor 220 may measure the thickness of the touch input, and when the measured thickness of the touch input is equal to or greater than a threshold value, the processor 220 may determine the touch input as the touch input by the finger 102, and when the measured thickness of the touch input is less than the threshold value, the processor 220 may determine the touch input as the touch input by the electronic pen 101.

Also, when the processor 220 determines the touch input as the touch input by the electronic pen 101, the processor 200 may recognize the touch input as the drawing input, and when the processor 220 determines the touch input as the touch input by the finger 102, the processor 200 may recognize the touch input as the external device control input.

The processor 220 according to an embodiment may control the external device in response to the external device control input, or may control the display 230 to output drawing data corresponding to the drawing input. The drawing data may refer, for example, and without limitation, to data indicating at least one of a figure, a letter, and a certain trace, or the like, which are recognized due to the touch input recognized by the display 230, in response to a touch input indicating at least one of the figure, the letter, and the certain trace, or the like.

The processor 220 may output the drawing data to a region of the display 230, the region corresponding to the screen of the external device. The output drawing data may be positioned in a certain region of the display 230, the region corresponding to the screen of the external device, or according to an embodiment, the output drawing data may be positioned outside the region of the display 230, the region corresponding to the screen of the external device.

When the drawing input is completed, the processor 220 according to an embodiment may store a captured image of the screen of the external device, and the drawing data. In this regard, the captured image of the screen of the external device and the drawing data may be stored as different files. Also, the processor 220 may control the display 230 to move and output the drawing data and the stored captured image, in response to an external input of moving the stored image. For example, the processor 220 may control the display 230 to move and output the stored captured image and the drawing data from among a plurality of items of drawing data output to the display 230 and positioned in the region of the display 230, the region corresponding to the screen of the external device.

The processor 220 according to an embodiment may delete the drawing data, in response to a user input. For example, the processor 220 may determine a thickness of a touch input, in response to the touch input of touching a drawing input output to the display 230. When the thickness of the touch input corresponds to a third threshold range, the processor 220 may recognize the touch input as an input of deleting the drawing input, and may delete the output drawing data, in response to the recognized input.

The processor 220 according to an embodiment may output the screen of the external device to an entire region of the display 230. For example, a user may attempt to output mirroring screen of the external device to the entire region of the display 230. For example, the processor 220 may output the screen of the external device to the entire region of the display 230, in response to a user input for requesting the electronic apparatus 100*a* to output the screen of the external device to the entire region of the display 230.

When a drawing input is received, the processor 220 may display, on the display 230, a menu for outputting the screen of the external device to at least a portion of the display 230. When the external device is mirrored in the electronic apparatus 100*a* and the screen of the external device is output to the entire region of the display 230, an external device control input that is received via the display 230 may be an input for controlling the external device. However, a change input for outputting the screen of the external device to at least a portion of the display 230 may be an input for controlling the electronic apparatus 100*a*. Therefore, in order to make a change to allow the screen of the external device to be output not to the entire region of the display 230 but to at least the portion of the display 230, there is a demand for a method, performed by the electronic apparatus 100a, of distinguishing between the input for controlling the external device and the input for controlling the electronic apparatus 100a.

When the screen of the external device is output to the entire region of the display 230 and a drawing input by the electronic pen 101 is received, the processor 220 according to an embodiment may control the display 230 to display the menu for outputting the screen of the external device to at least a portion of the display 230. In response to an input of selecting the displayed menu using the electronic pen 101, the processor 220 may control the display 230 to reduce and output the screen of the external device to at least the portion of the display 230.

The processor 220 according to an embodiment may distinguish between the input of selecting the menu using the electronic pen 101 and an external device control input by the finger 102, based on a thickness of a received touch input. Accordingly, even when the screen of the external device is being output to the entire region of the display 230, a user may easily switch a region of the display 230 to which the screen of the external device is output.

The display 230 according to an embodiment may output the screen of the external device mirrored in the electronic apparatus 100a. Also, the display 230 may output drawing data corresponding to a drawing input received from a user.

The input interface 240 may be an interface including various input interface circuitry to receive a user input and may receive a touch input using a touch-sensitive device. The user input may include, for example, and without limitation, a touch input by a user's finger, an electronic pen input, an input by an eraser arranged at an opposite end of an electronic pen, a palm touch input, or the like.

When the display 230 is embodied as a touchscreen, the display 230 may be used an output device and an input device. For example, the display 230 may include, for example, and without limitation, at least one of a liquid crystal display, a thin film transistor-liquid crystal display, an organic light-emitting diode display, a flexible display, a three-dimensional (3D) display, an electrophoretic display, or the like. According to a type of the electronic apparatus 100a, the electronic apparatus 100a may include two displays 230.

Figure 2B:
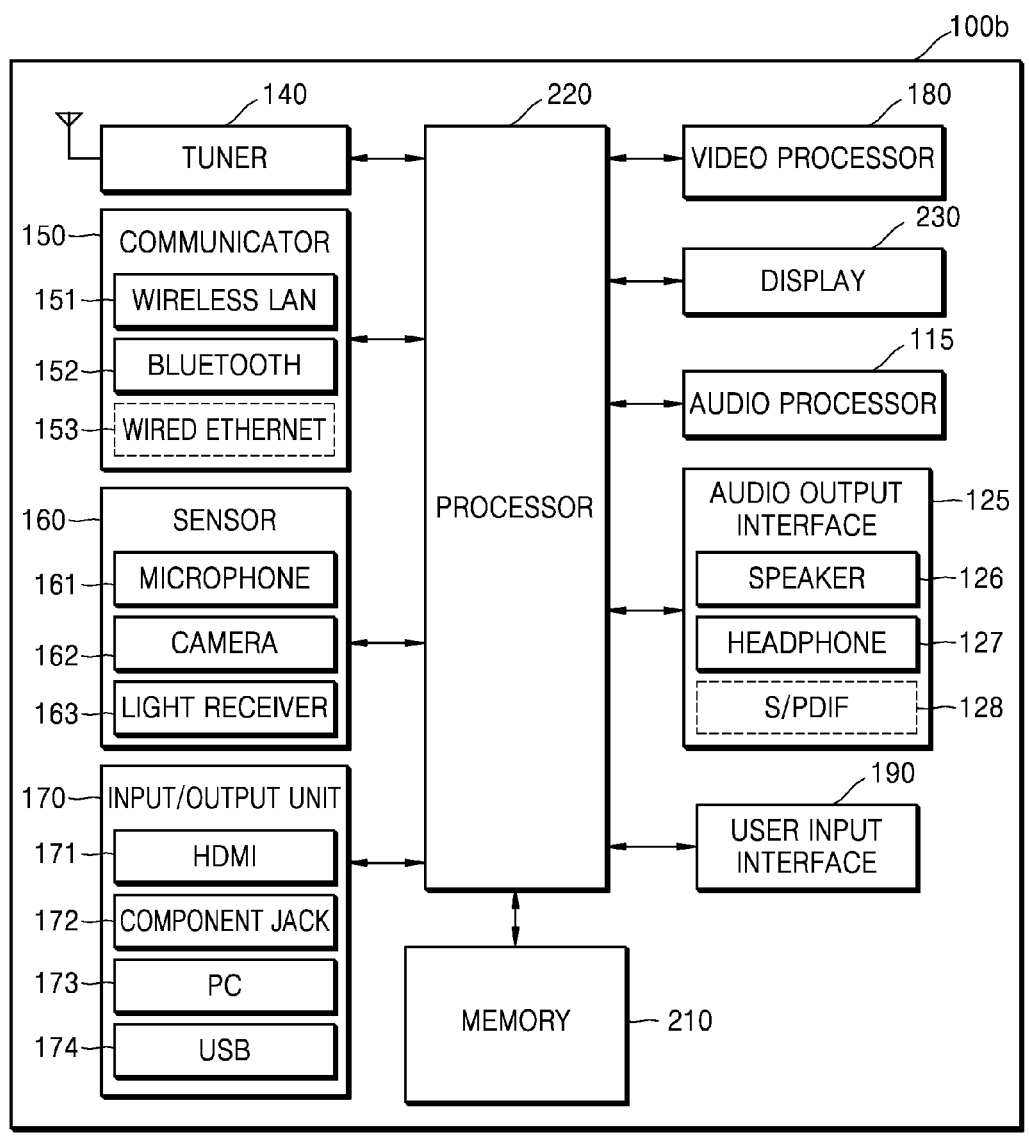
FIG. 2B is a block diagram illustrating an example configuration of the electronic apparatus according to another embodiment.

FIG. 2B is a block diagram illustrating an example configuration of the electronic apparatus 100b according to another embodiment.

As illustrated in FIG. 2B, the electronic apparatus 100b may further include a tuner 140, a communicator (e.g., including communication circuitry) 150, a sensor 160, an input/output unit (e.g., including input/output circuitry) 170, a video processor (e.g., including video processing circuitry) 180, an audio processor (e.g., including audio processing circuitry) 115, an audio output interface (e.g., including audio output circuitry) 125, and a user input interface (e.g., including input circuitry) 190, in addition to the memory 210, the processor 220, and the display 230.

Redundant descriptions of the memory 210, the processor 220, and the display 230 which are previously provided with reference to FIG. 2A will not be repeated in FIG. 2B.

The tuner 140 may include various circuitry to select a frequency of a channel the electronic apparatus 100b attempts to receive from among many electric wave components by tuning the frequency through amplification, mixing, resonance, or the like with respect to a broadcast signal received in a wired or wireless manner. The broadcast signal may include audio, video, and additional information (for example, an electronic program guide (EPG)).

The broadcast signal received via the tuner 140 is decoded (e.g., audio decoding, video decoding, or additional information decoding) and then is divided into audio, video, and/or additional information. The divided audio, video, and/or additional information may be stored in the memory 210 by the control of the processor 220.

The electronic apparatus 100b may include one or more tuners 140. The tuner 140 and the electronic apparatus 100b may be embodied as an all-in-one type apparatus, the tuner 140 may be embodied in a separate device (e.g., a set-top box (not shown)) having a tuner electrically connected to the electronic apparatus 100b, or the tuner 140 may be embodied as a tuner (not shown) connected to the input/output unit 170.

The communicator 150 may include various communication circuitry and connect the electronic apparatus 100b with an external device (e.g., an audio device, a mobile device, etc.) by the control of the processor 220. The processor 220 may transmit/receive contents to/from the external device connected through the communicator 150, may download an application from the external device, or may browse the web.

The communicator 150 may include circuitry that provides, for example, and without limitation, one of wireless local area network (WLAN) 151, Bluetooth 152, and wired Ethernet 153, according to capability and structure of the electronic apparatus 100b. Also, the communicator 150 may include a combination of WLAN 151, Bluetooth 152, and wired Ethernet 153. The communicator 150 may receive a control signal of a control device by the control of the processor 220. The control signal may be a Bluetooth type signal, a radio frequency (RF) type signal, or a Wi-Fi type signal.

The communicator 150 may further include circuitry that provides, for example, and without limitation, short-range communication (e.g., near-field communication (NFC) (not shown), Bluetooth Low Energy (BLE) (not shown), etc.) in addition to Bluetooth 152.

The sensor 160 may include various sensors and sense a voice of a user, an image of the user, or an interaction of the user, and may include various sensors, such as, for example, and without limitation, a microphone 161, a camera 162, and a light receiver 163.

The microphone 161 may receive an uttered voice of the user. The microphone 161 may convert the received voice into an electric signal and may output the electric signal to the processor 220.

The camera 162 may receive an image (e.g., sequential frames) corresponding to a motion of the user which includes a gesture within a recognition range of the camera 162.

The light receiver 163 may receive a light signal (including a control signal) received from the control device. The light receiver 163 may receive the light signal corresponding to a user input (for example, a touch, a press, a touch gesture, a voice, or a motion) from the control device. The control signal may be extracted from the received light signal by the control of the processor 220.

The input/output unit 170 may include various input/output circuitry and receives, by the control of the processor 220, a video (e.g., a moving picture, etc.), an audio (e.g., voice, music, etc.), additional information (e.g., an EPG, etc.), or the like from an external source of the electronic apparatus 100b. The input/output unit 170 may include various input/output circuitry, such as, for example, and without limitation, at least one of a High-Definition Multimedia Interface (HDMI) port 171, a component jack 172, a PC port 173, and a universal serial bus (USB) port 174. The input/output unit 170 may include a combination of the HDMI port 171, the component jack 172, the PC port 173, and the USB port 174.

The memory 210 according to an embodiment may store a program for processing and controlling the processor 220, and may store data input to or output from the electronic apparatus 100b.

The processor 220 may include various processing circuitry and control general operations of the electronic apparatus 100b and flows of signals between internal elements of the electronic apparatus 100b, and may process data of the electronic apparatus 100b. In a case where a user input is received or a preset and stored condition is satisfied, the processor 220 may execute an operating system (OS) and various applications stored in the memory 210.

The processor 220 according to an embodiment may execute one or more instructions, which are stored in the memory 210, to control the display 230 to output a screen of an external device to at least a portion of the display 230 by mirroring the external device, to recognize a touch input as a drawing input or an external device control input based on a thickness of the received touch input, and to control the external device in response to the external device control input or to control the display 230 to output the drawing input.

The video processor 180 may include various video processing circuitry and process image data to be displayed on the display 230, and may perform various image processing operations including a decoding operation, a rendering operation, a scaling operation, a noise filtering operation, frame rate conversion, resolution conversion, etc., with respect to the image data.

The display 230 may display a video included in the broadcast signal received via the tuner 140, by the control of the processor 220. Also, the display 230 may display content (e.g., a moving picture) input via the communicator 150 or the input/output unit 170. The display 230 may output an image stored in the memory 210, by the control of the processor 220. Also, the display 230 according to an embodiment may output the screen of the external device mirrored in the electronic apparatus 100b, and may output drawing data corresponding to the received drawing input.

When the display 230 and a touch pad form a mutual layer structure and then are embodied as a touchscreen, the display 230 may be used an output device and an input device. For example, the display 230 may include, for example, and without limitation, at least one of a liquid crystal display, a thin film transistor-liquid crystal display, an organic light-emitting diode display, a flexible display, a 3D display, an electrophoretic display, or the like.

The audio processor 115 may include various audio processing circuitry and performs processing on audio data. The audio processor 115 may perform various processing operations including a decoding operation, an amplification operation, a noise filtering operation, or the like on the audio data.

The audio output interface 125 may include various audio output circuitry and output, by the control of the processor 220, audio included in the broadcast signal that is received by the tuner 140, audio that is input via the communicator 150 or the input/output unit 170, or audio stored in the memory 210. The audio output interface 125 may include various audio output circuitry, such as, for example, and without limitation, at least one of a speaker 126, a headphone output terminal 127, a Sony/Philips Digital Interface Format (S/PDIF) output terminal 128, or the like.

The user input interface 190 may, refer, for example, to a unit through which the user inputs data to control the electronic apparatus 100b. The user input interface 190 may include various input interface circuitry, such as, for example, and without limitation, a touch input interface to receive a touch input. For example, the user input interface 190 may include various input circuitry, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, a jog switch, or the like. The block diagrams of the electronic apparatuses 100a and 100b illustrated in FIGS. 2A and 2B are block diagrams for an embodiment. Elements of the block diagram may be integrated, added, or omitted based on the specifications of the electronic apparatuses 100a and 100b implemented actually. For example, when necessary, two or more elements may be integrated into one element or one element may be divided into two or more elements. A function executed in each element is intended to describe embodiments, and a detailed operation or apparatus thereof does not limit the scope of the present disclosure.

Figure 3A:
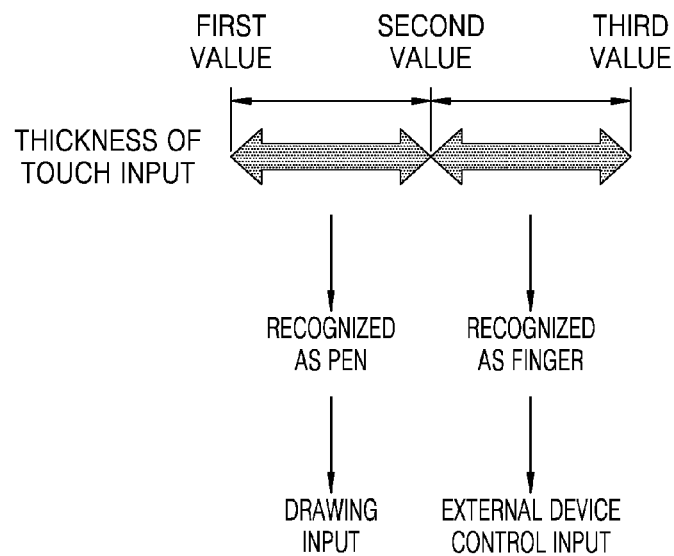
FIG. 3A is a diagram illustrating an example of types of inputs which are differentiated according to thicknesses of touch inputs, according to an embodiment.

FIG. 3A is a diagram illustrating an example of types of inputs which are differentiated according to thicknesses of touch inputs, according to an embodiment.

Referring to FIG. 3A, when a thickness of a touch input which is received via a mirroring screen using a touch input interface of the electronic apparatus 100, the mirroring screen being output to at least a portion of a display, is in a range between a first value and a second value, the touch input may be recognized as an input by an electronic pen, and may be processed as a drawing input corresponding to the touch input.

When a thickness of a touch input which is received using the touch input interface of the electronic apparatus 100 is in a range between the second value and a third value, the touch input may be recognized as an input by a finger of a user, and may be processed as an external device control input corresponding to the touch input.

In FIG. 3A, the range between the first value and the second value may be referred to as a first threshold range, and the range between the second value and the third value may be referred to as a second threshold range.

Figure 3B:
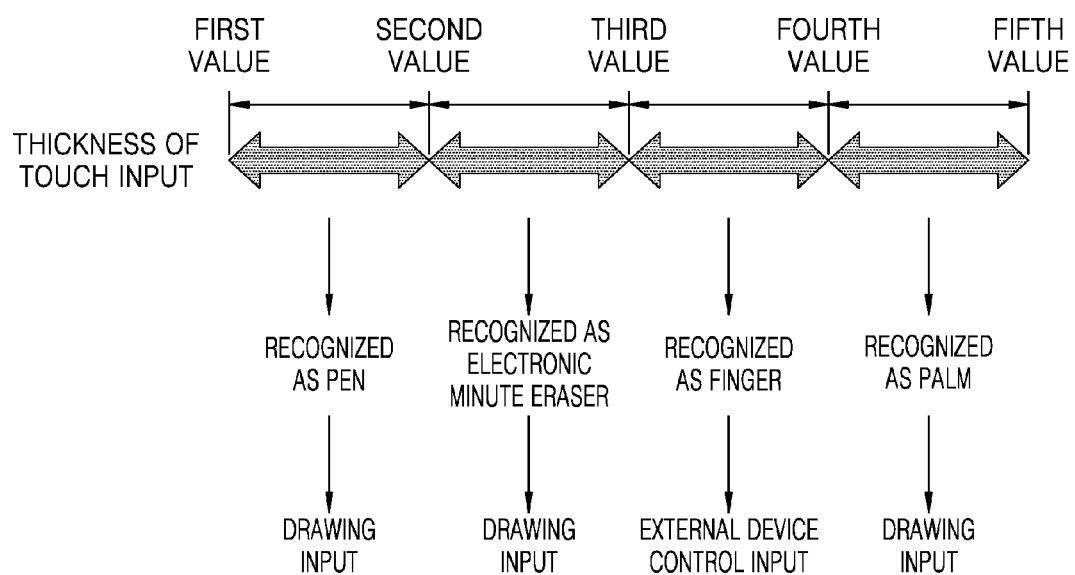
FIG. 3B is a diagram illustrating an example of types of inputs which are differentiated according to thicknesses of touch inputs, according to another embodiment.

FIG. 3B is a diagram illustrating an example of types of inputs which are differentiated according to thicknesses of touch inputs, according to another embodiment.

Referring to FIG. 3B, when a thickness of a touch input which is received via a mirroring screen using a touch input interface of the electronic apparatus 100, the mirroring screen being output to at least a portion of a display, is in a range between a first value and a second value, the touch input may be recognized as an input by an electronic pen, and may be processed as a drawing input corresponding to the touch input.

When a thickness of a touch input which is received using the touch input interface of the electronic apparatus 100 is in a range between the second value and a third value, the touch input may be recognized as an input by an electronic minute eraser, and may be processed as a drawing input corresponding to the touch input. In response to the touch input by the electronic minute eraser, the electronic apparatus 100 may erase drawing data output to a screen of the electronic apparatus 100. The electronic minute eraser may be arranged as a part of the electronic pen or may be embodied as a device separate from the electronic pen.

When a thickness of a touch input which is received using the touch input interface of the electronic apparatus 100 is in a range between the third value and a fourth value, the touch input may be recognized as an input by a finger of a user, and may be processed as an external device control input corresponding to the touch input.

When a thickness of a touch input which is received using the touch input interface of the electronic apparatus 100 is in a range between the fourth value and a fifth value, the touch input may be recognized as an input by a palm of the user, and may be processed as a drawing input corresponding to the touch input. In response to the touch input by the palm, the electronic apparatus 100 may erase drawing data, which is output to the screen, at a thickness greater than a thickness at which the electronic minute eraser erases.

In FIG. 3B, the range between the first value and the second value may be referred to as a first threshold range, the range between the second value and the third value may be referred to as a second threshold range, the range between the third value and the fourth value may be referred to as a third threshold range, and the range between the fourth value and the fifth value may be referred to as a fourth threshold range.

The first through fifth values illustrated in FIG. 3B are not necessarily used and may be selectively used depending on systems. For example, in a certain system, recognition by a palm may not be used. Also, in another system, recognition by the electronic minute eraser may not be used.

The first through fifth values illustrated in FIG. 3B may be variously determined.

According to an embodiment, the first through fifth values may be optimally determined as a result of, for example, and without limitation, empirical testing and may be initially set.

According to an embodiment, the first through fifth values may be set or changed by a user via an appropriate user interface.

According to an embodiment, the first through fifth values may be determined using a trained model using one or more neural networks. Each of the one or more neural networks may be a group of algorithms being trained with respect to the first through fifth values, based on thickness data of a touch input which is input to each neural network, according to artificial intelligence (AI).

A method, performed by the electronic apparatus 100, of outputting a mirroring screen of an external device and differentiating between operations according to thicknesses of touch inputs will now be described with reference to FIGS. 4A, 4B, 4C, 4D and 4E.

The electronic apparatus 100 according to an embodiment may mirror the external device, thereby outputting a screen of the external device to the display 230. For example, the electronic apparatus 100 may output the screen of the external device to an entire region of the display 230 or at least a portion of the display 230, and may control the external device via the screen of the external device which is output to the display 230. Also, the electronic apparatus 100 may receive a touch input via the display 230, and may recognize the received touch input as a drawing input or an external device control input, based on a thickness of the received touch input.

For example, when the thickness of the touch input corresponds to a first threshold range, the electronic apparatus 100 may recognize the touch input as the drawing input, when the thickness of the touch input corresponds to a second threshold range, and the electronic apparatus 100 may recognize the touch input as the external device control input, wherein the first threshold range may be less than the second threshold range. According to an embodiment, the electronic apparatus 100 may recognize the received touch input as a touch input by, for example, and without limitation, the electronic pen 101 or a touch input by the finger 102, based on the thickness of the touch input, but the present disclosure is not limited thereto.

Figure 4A:
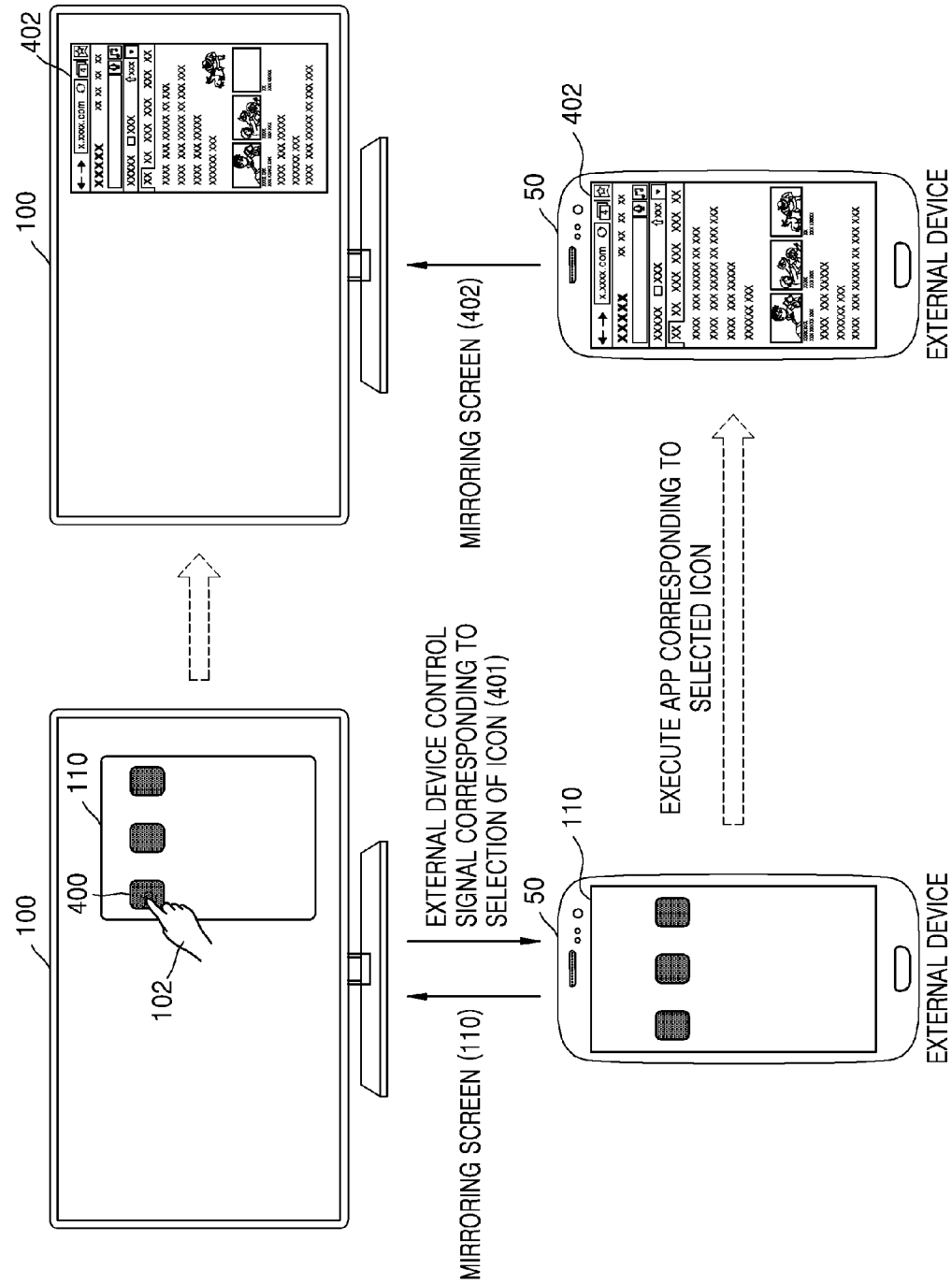
FIG. 4A is a diagram illustrating an example in which an external device is controlled based on a thickness of a touch input, according to an embodiment.

FIG. 4A is a diagram illustrating an example in which an external device 50 is controlled based on a thickness of a touch input, according to an embodiment.

Referring to FIG. 4A, the electronic apparatus 100 may mirror the external device 50 and then may output a screen 110 of the mirrored external device 50 to at least a portion of the display 230. Also, the electronic apparatus 100 may receive a touch input of touching an icon 400 displayed on the screen 110 of the external device 50 which is output to the display 230, and may recognize the received touch input as an input of selecting the icon 400, based on a thickness of the touch input. Because the received touch input is recognized as the input of selecting the icon 400, the electronic apparatus 100 may control the external device 50, in response to the input of selecting the icon 400. For example, when the selected icon 400 is an icon indicating an application installed in the external device 50, the electronic apparatus 100 may control the external device 50 to execute the application, in response to the input of selecting the icon 400. For example, the electronic apparatus 100 may generate an external device control signal 401 corresponding to selection of the icon 400, i.e., the signal 401 indicating that the icon 400 has been selected, and may transmit the generated external device control signal 401 to the external device 50. The external device 50 receives the external device control signal 401, and performs a control function corresponding to selection of the icon 400, in response to the external device control signal 401. For example, when the icon 400 indicates an application installed in the external device 50, the external device 50 may execute the application, in response to selection of the icon 400. When the application corresponding to the icon 400 is executed, the external device 50 may display a screen 402 of the executed application, and due to a mirroring state, the electronic apparatus 100 may receive and display the screen 402 of the executed application which is displayed on a display of the external device 50.

As another example, when the selected icon 400 indicates a certain menu of the external device 50, the electronic apparatus 100 may control the external device 50 to perform an operation corresponding to the selected menu. The operation corresponding to the selected menu may include, for example, and without limitation, a page up/down menu, or the like.

FIG. 4B is a diagram illustrating an example in which the external device 50 is controlled based on a thickness of a touch input, according to another embodiment.

Referring to FIG. 4B, the electronic apparatus 100 displays a mirroring screen 402 on at least a portion of the display 230. At a lower part of the mirroring screen 402, a go-to-previous page icon 411 and a go-to-next page icon 412 may be displayed. The go-to-previous page icon 411 may perform a function of returning to a page that was open prior to a current page, based on a history of web pages. The go-to-next page icon 412 may perform a function of going to a page that was open after the current page, based on the history of web pages.

The user may select the go-to-previous page icon 411 using the finger 102. The electronic apparatus 100 may receive an icon selecting input, and may recognize a received touch input as the icon selecting input, based on a thickness of the touch input. When the received touch input is recognized as the icon selecting input, the electronic apparatus 100 may control the external device 50, in response to the icon selecting input. In detail, the electronic apparatus 100 may generate an external device control signal 413 corresponding to selection of the go-to-previous page icon 411 which indicates that the go-to-previous page icon 411 has been selected, and may transmit the generated external device control signal 413 to the external device 50. The external device 50 receives the external device control signal 413, and performs a control function corresponding to selection of the go-to-previous page icon 411. When a function of returning to a previous page is executed in response to the go-to-previous page icon 411, the external device 50 may display a screen 414 of a page that was open prior to the current page, based on the history, and due to a mirroring state, the electronic apparatus 100 may receive and display the screen 414 of the page displayed on the display of the external device 50. Similarly, when the go-to-next page icon 412 is selected using the finger 102, the external electronic device 50 may perform a control function corresponding to the selection as described above with reference to the go-to-previous page icon 411, but performing the function of displaying the next page.

FIG. 4C is a diagram illustrating an example in which the external device 50 is controlled based on a thickness of a touch input, according to another embodiment.

Referring to FIG. 4C, the electronic apparatus 100 displays a mirroring screen 402 on at least a portion of the display 230. The user may perform vertical dragging on the displayed mirroring screen 402 using the finger 102. The electronic apparatus 100 may receive a drag touch input, and may recognize the received drag touch input as an external device control input, based on a thickness of the drag touch input. When the received drag touch input is recognized as the external device control input, the electronic apparatus 100 may control the external device 50, in response to the drag touch input. For example, the electronic apparatus 100 may generate a control signal corresponding to dragging, e.g., an external device control signal 421 indicating that the dragging started at a start position and ended at an end position, and may transmit the generated external device control signal 421 to the external device 50. The external device 50 receives the external device control signal 421, and performs a control function corresponding to the external device control signal 421. That is, the external device 50 may perform page scrolling, in response to the external device control signal 421 indicating that the dragging started at a start position and ended at an end position, and may display a new page screen 422 based on the page scrolling, and due to a mirroring state, the electronic apparatus 100 may receive and display the page screen 422 displayed on the display of the external device 50.

FIG. 4D is a diagram illustrating an example in which the external device 50 is controlled based on a thickness of a touch input, according to another embodiment.

Referring to FIG. 4D, the electronic apparatus 100 displays the mirroring screen 402 on at least a portion of the display 230. The user may perform horizontal dragging on the displayed mirroring screen 402 using the finger 102. The electronic apparatus 100 may receive a drag touch input, and may recognize the received drag touch input as an external device control input, based on a thickness of the drag touch input. When the received drag touch input is recognized as the external device control input, the electronic apparatus 100 may control the external device 50, in response to the drag touch input. For example, the electronic apparatus 100 may generate a control signal corresponding to dragging, e.g., an external device control signal 431 indicating that the dragging started at a start position and ended at an end position, and may transmit the generated external device control signal 431 to the external device 50. The external device 50 receives the external device control signal 431, and performs a control function corresponding to the external device control signal 431. That is, the external device 50 may turn to an next page, in response to the external device control signal 431 indicating that the dragging started at a start position and ended at an end position, and may display a new page screen 432 according to the turning of page, and due to a mirroring state, the electronic apparatus 100 may receive and display the page screen 432 displayed on the display of the external device 50.

Figure 4E:
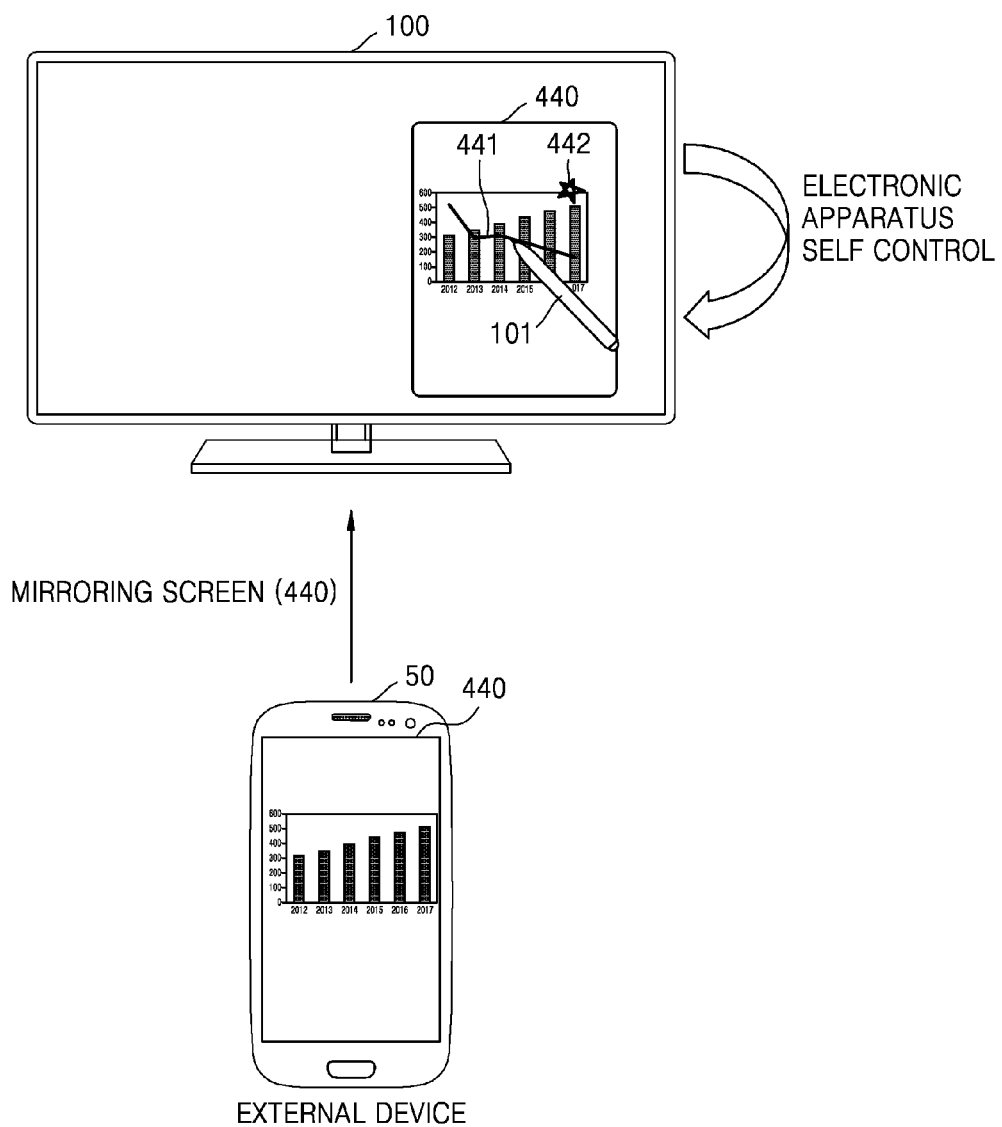
FIG. 4E is a diagram illustrating an example in which a touch input is processed as a drawing input, based on a thickness of a touch input, according to an embodiment.

FIG. 4E is a diagram illustrating an example in which a touch input is processed as a drawing input, based on a thickness of a touch input, according to an embodiment.

Referring to FIG. 4E, in a case where a document file is executed in the external device 50 and a document file screen 440 is output to the display of the external device 50, the mirrored electronic apparatus 100 may output, to the display 230, the document file screen 440 of the external device 50 to which the document file has been output. Also, the electronic apparatus 100 may receive a touch input of drawing a certain trace 441 or a touch input of drawing a certain FIG. 442 on the document file screen 440 that is output to the display 230, and may recognize the received touch input as a drawing input, based on a thickness of the touch input. When the received touch input is recognized as the drawing input, the electronic apparatus 100 may output drawing data corresponding to the drawing input to the display 230. Accordingly, the electronic apparatus 100 may automatically recognize a type of the touch input, based on the thickness of the touch input, without an additional operation for changing the type (e.g., an input of selecting an icon or the drawing input) of the touch input. The drawing input is associated with a function of self controlling the electronic apparatus 100, therefore, the drawing input is executed in the electronic apparatus 100 and is not used in controlling the external device 50, such that the drawing data is not displayed on the external device 50.

Figure 5:
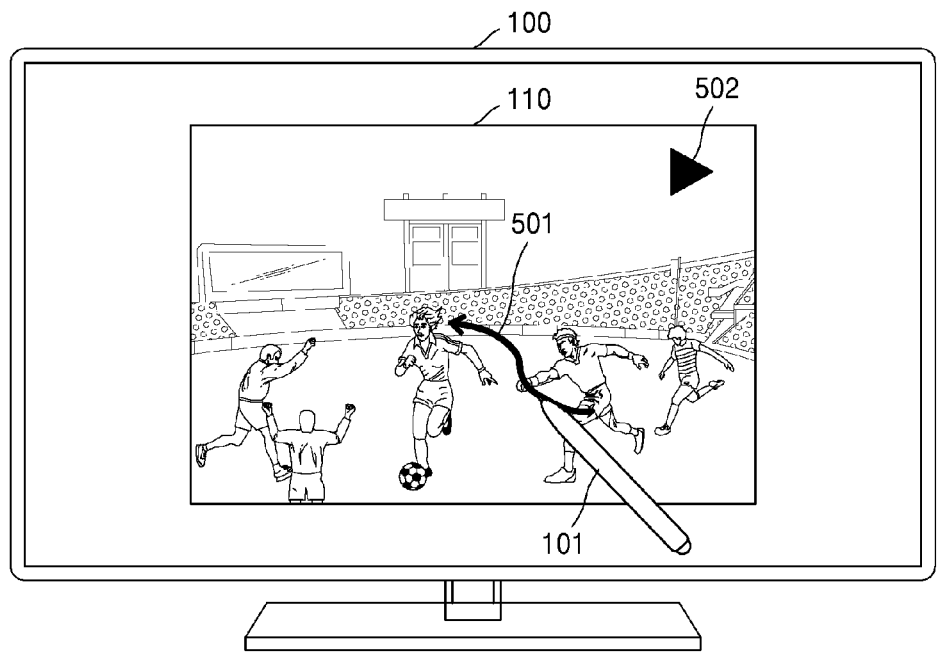
FIG. 5 is a diagram illustrating an example in which a drawing input is received while a video is being output to a display of the electronic apparatus according to an embodiment.

FIG. 5 is a diagram illustrating an example in which a drawing input is received while a video is being output to the display 230 of the electronic apparatus 100 according to an embodiment.

According to an embodiment, an external device may be mirrored in the electronic apparatus 100 while the external device reproduces the video, and the electronic apparatus 100 may output, to the display 230, a screen of the external device which shows the video that is being reproduced.

The electronic apparatus 100 according to an embodiment may receive a touch input, and may recognize the received touch input as a drawing input, based on a thickness of the touch input. The electronic apparatus 100 may determine the received touch input as a touch input by the electronic pen 101, and may recognize the touch input by the electronic pen 101 as the drawing input. When the received touch input is recognized as the drawing input, the electronic apparatus 100 may control the external device to change the video being reproduced in the external device to a pause state.

For example, referring to FIG. 5, a football game video may be used in a meeting for analyzing a football strategy, and a user may provide an explanation while drawing a figure on the football game video to help understanding of meeting participants. Also, the football game video used in the meeting may not be stored in the electronic apparatus 100 but may be stored in the external device. Here, the external device reproduces the football game video, and is mirrored in the electronic apparatus 100, the screen 110 of the external device 50 which reproduces the football game video may be output to the display 230 of the electronic apparatus 100.

When the screen 110 of the external device 50 which reproduces the football game video is output to the display 230, the user may draw, for the explanation, a certain trace 501 on the display 230 using the electronic pen 101. The electronic apparatus 100 may recognize the received touch input as the drawing input, based on the thickness of the received touch input. Also, when the touch input is recognized as the drawing input, the electronic apparatus 100 may control the external device 50 to change the football game video being reproduced in the external device 50 to a pause state. For example, as illustrated in FIG. 5, an icon 502 representing that a video is in a pause state may be output to the screen 110 of the external device 50, but the present disclosure is not limited thereto.

Figure 6:
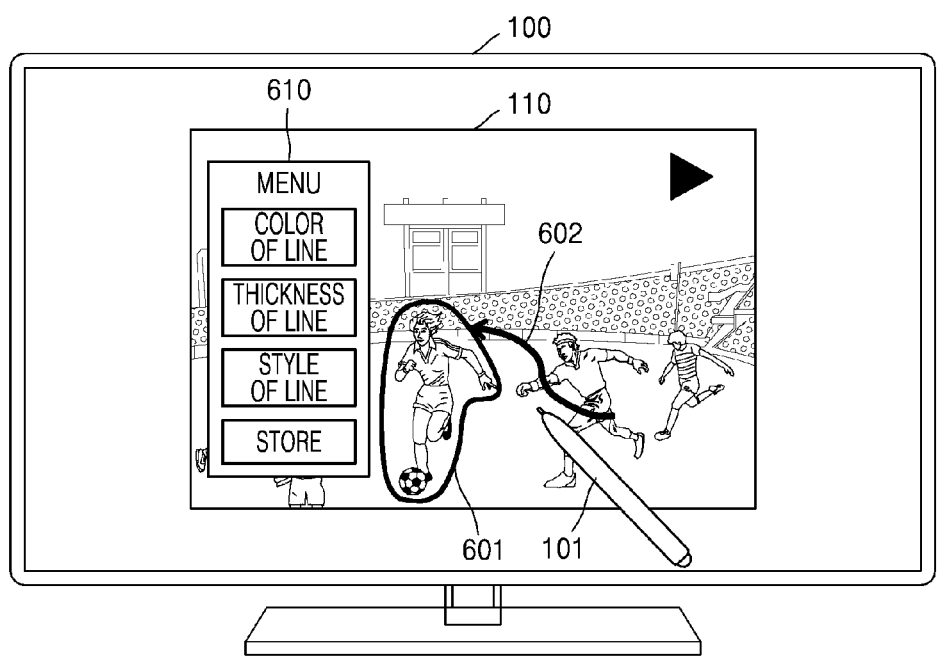
FIG. 6 is a diagram illustrating an example in which the electronic apparatus outputs a drawing input-related menu, according to an embodiment.

FIG. 6 is a diagram illustrating an example in which the electronic apparatus 100 outputs a drawing input-related menu 610, according to an embodiment.

The electronic apparatus 100 according to an embodiment may output the drawing input-related menu 610, in response to a preset touch input. For example, the present touch input may be, but is not limited to, an input of touching the display 230 for at least a preset time period (e.g., 1 second) or an input of tapping the display 230 for at least a preset number of times (e.g., twice).

Referring to FIG. 6, when the electronic apparatus 100 outputs, to the display 230, the screen 110 of the external device 50 which reproduces the football game video, a touch input of drawing a FIG. 601 and/or an arrow 602 may be received from the electronic pen 101. The electronic apparatus 100 may determine the received touch input as an input by the electronic pen 101, based on a thickness of the touch input, and may recognize the received touch input as a drawing input. Also, the electronic apparatus 100 may output the FIG. 601 and/or the arrow 602 due to the drawing input to the display 230.

When the drawing input is completed, and an input of touching the display 230 for at least a preset time period (e.g., 1 second) is received from the electronic pen 101, the electronic apparatus 100 may output the drawing input-related menu 610. The drawing input-related menu 610 may include, but is not limited to, a menu for setting an attribute of a drawing input, storing a drawing input, or the like. For example, when the drawing input is an input of drawing a certain trace, the drawing input-related menu 610 may include a menu for setting a color, a thickness, and a style (e.g., a solid line, a broken line, or the like) of a line indicating the trace, and may include a menu for storing drawing data output to the display 230. Also, when the drawing input is an input of inputting a text, the drawing input-related menu 610 may include, but is not limited to, a menu for setting at least one of a font and a size of the text.

The electronic apparatus 100 according to an embodiment may output the drawing input-related menu 610, and may perform an operation (e.g., to set the line as a blue color line) corresponding to the menu selected by the user.

Figure 7A:
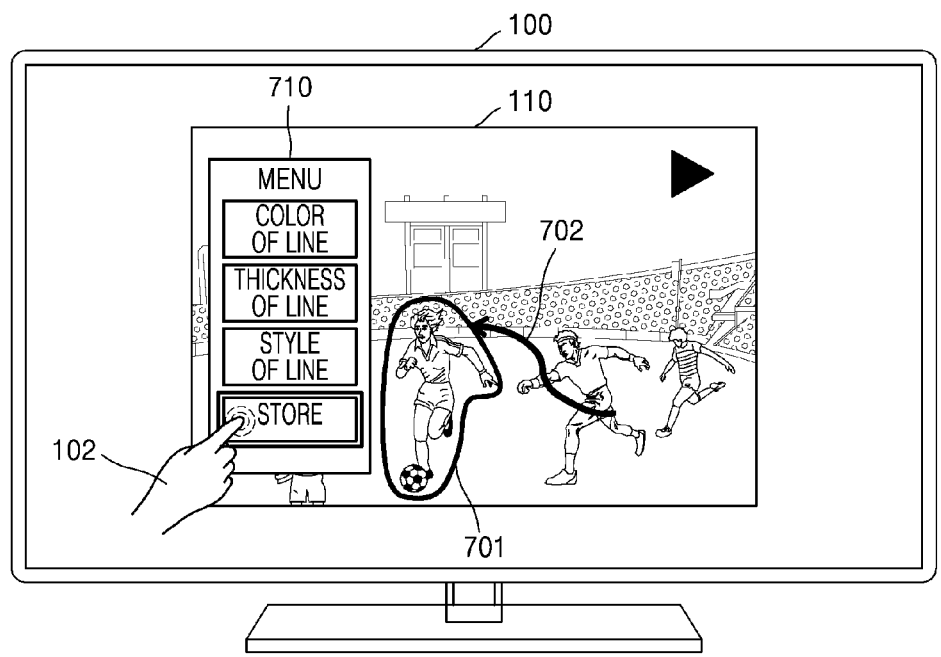
FIGS. 7A, 7B and 7C are diagrams illustrating an example in which the electronic apparatus stores drawing data and a captured image of a screen of the external device, according to an embodiment.
Figure 7B:
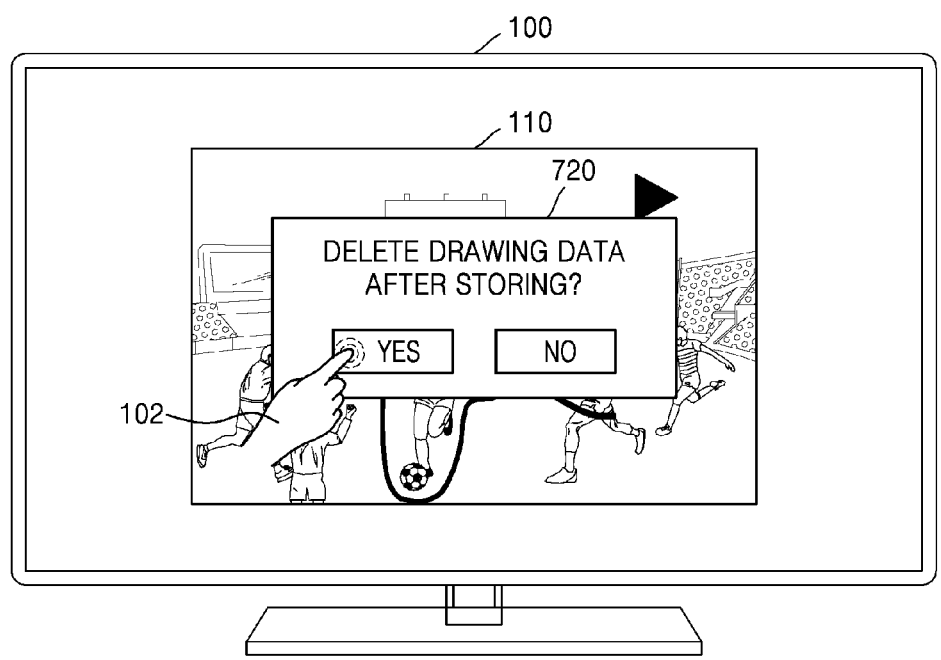
Figure 7C:
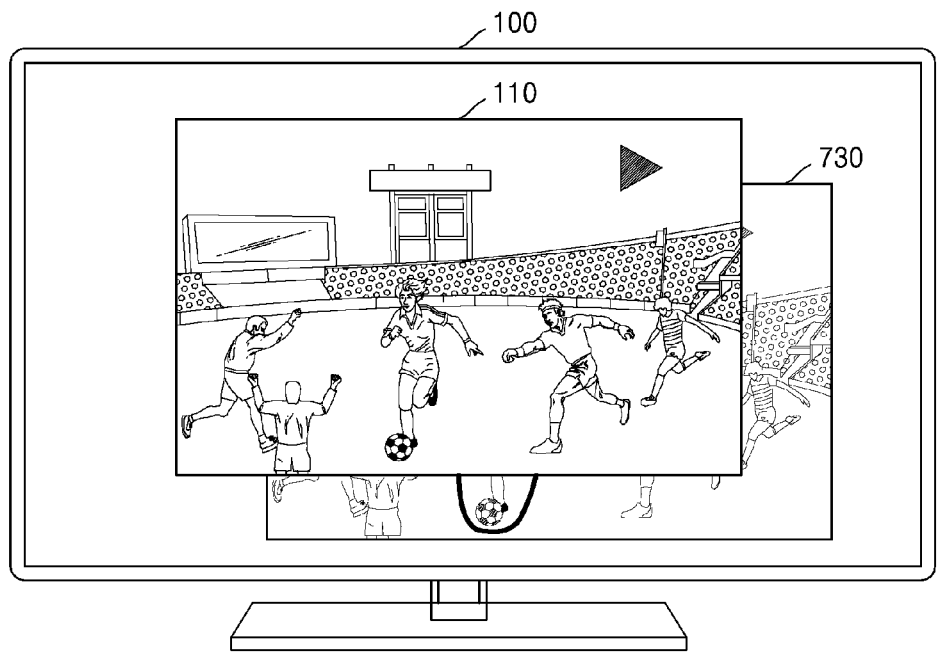

FIGS. 7A, 7B and 7C are diagrams illustrating an example in which the electronic apparatus 100 stores drawing data and a captured image of the screen 110 of the external device 50, according to an embodiment.

The electronic apparatus 100 according to an embodiment may store drawing data and a captured image of the screen 110 of the external device 50.

Referring to FIG. 7A, the electronic apparatus 100 may store drawing data (e.g., 701, 702) and a captured image of the screen 110 of the external device 50, in response to a touch input of selecting a "store" menu from a drawing input-related menu 710. Here, the touch input of selecting the "store" menu may be a touch input by the hand 102 of the user, and the electronic apparatus 100 may recognize the touch input as an input of selecting an icon, based on a thickness of the touch input.

The electronic apparatus 100 according to an embodiment may store the drawing data and the captured image of the screen 110 of the external device 50 as different files, in response to the touch input of selecting the "store" menu. Also, the electronic apparatus 100 may output the captured image and the drawing data, which are stored as the different files, in an overlapping manner.

After the electronic apparatus 100 stores the captured image of the screen 110 of the external device 50 and the drawing data, the electronic apparatus 100 may delete the drawing data. For example, referring to FIG. 7B, when the touch input of selecting the "store" menu from the drawing input-related menu 710 is received, the electronic apparatus 100 may output a menu 720 for selecting whether to delete the drawing data. For example as illustrated in FIG. 7B, when a touch input of touching a region of the output menu 720, the region corresponding to "YES", is received, the electronic apparatus 100 may determine the received touch input as the touch input by the finger 102, based on a thickness of the touch input, and may recognize the touch input as an input of selecting an icon. Accordingly, after the electronic apparatus 100 stores the captured image of the screen 110 of the external device 50 and the drawing data, the electronic apparatus 100 may delete the output drawing data.

The electronic apparatus 100 according to an embodiment may store the captured image of the screen 110 of the external device 50 and the drawing data, and may additionally output the stored captured image and the stored drawing data to the display 230. Referring to FIG. 7C, the electronic apparatus 100 may store the captured image of the screen 110 of the external device 50 and the drawing data, in response to a user input, and may additionally output the stored captured image and the stored drawing data 730 to the screen 110 of the external device 50. After the captured image of the screen 110 of the external device 50 and the drawing data are stored, when an input of selecting a menu for deleting the drawing data is received, the electronic apparatus 100 may output the stored captured image and the drawing data 730 to the display 230, and may delete drawing data output to the screen 110 of the external device 50.

Figure 8A:
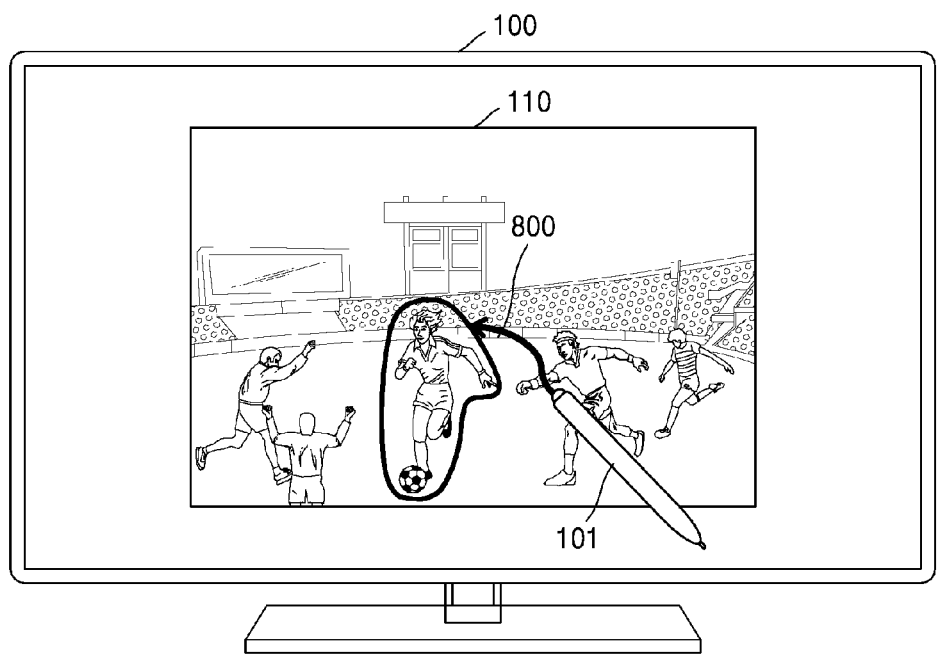
FIGS. 8A and 8B are diagrams illustrating an example in which the electronic apparatus deletes drawing data, according to an embodiment.
Figure 8B:
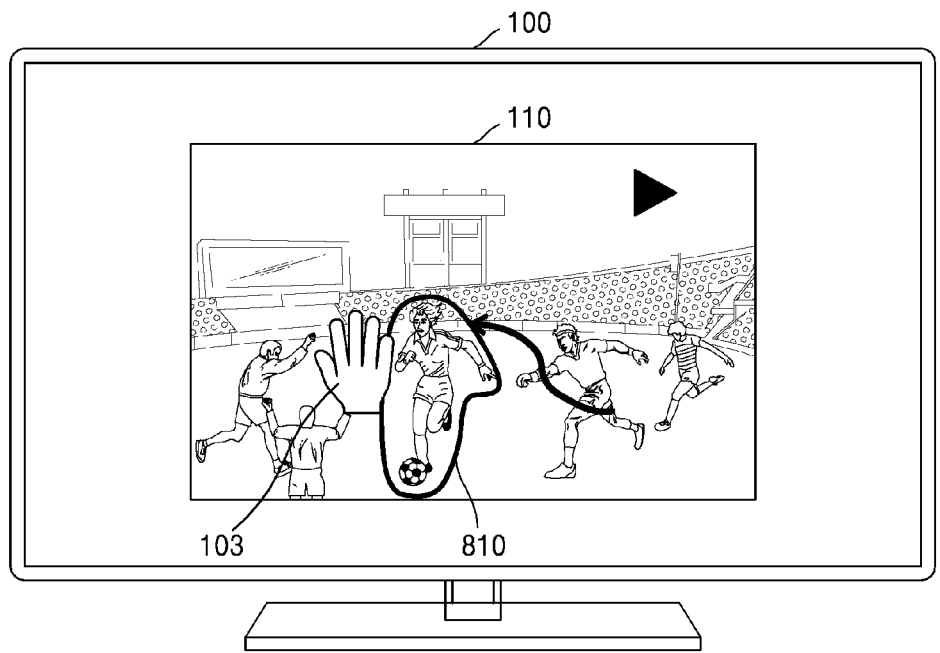

FIGS. 8A and 8B are diagrams illustrating an example in which the electronic apparatus 100 deletes drawing data, according to an embodiment.

The electronic apparatus 100 according to an embodiment may delete drawing data output to the display 230. For example, referring to FIG. 8A, when the external device 50 is mirrored in the electronic apparatus 100 and therefore the screen 110 of the external device 50 which reproduces a football game video is output to the display 230, the user may draw an arrow 800 using the electronic pen 101 to explain the football game video. The electronic apparatus 100 may recognize a received touch input as a drawing input, based on a thickness of the touch input, and may output, to the display 230, the arrow 800 due to the touch input. To delete the arrow 800 output to the display 230, the user may delete at least a portion of the arrow 800 output to the display 230 using an opposite end of the electronic pen 101.

A thickness of a touch input received from the opposite end of the electronic pen 101 may be greater than a thickness of a touch input received from a tip of the electronic pen 101. The electronic apparatus 100 may measure the thickness of the touch input received from the opposite end of the electronic pen 101, and based on the measured thickness of the touch input, may determine the received touch input as the touch input by the opposite end of the electronic pen 101. Also, when the received touch input is determined as the touch input by the opposite end of the electronic pen 101, the electronic apparatus 100 may recognize the touch input as an input of deleting drawing data, and may delete at least a portion of the arrow 800, in response to the recognized input.

Also, the electronic apparatus 100 may delete a drawing input output to the display 230, in response to a touch input using a palm. For example, referring to FIG. 8B, in response to an input of touching, using a palm 103, at least a portion of a drawing input 810 output to the display 230, the electronic apparatus 100 may delete at least a portion of the drawing input 810 output to the display 230. The electronic apparatus 100 may determine whether the input is a touch input by the palm 103, based on a thickness of the touch input. For example, when the thickness of the touch input is equal to or greater than a threshold value (e.g., 3 cm), the electronic apparatus 100 may determine the received touch input as the touch input by the palm 103. When the received touch input is determined as the touch input by the palm 103, the electronic apparatus 100 may delete a drawing input output to a region of the display 230 from which the touch input is detected.

Figure 9:
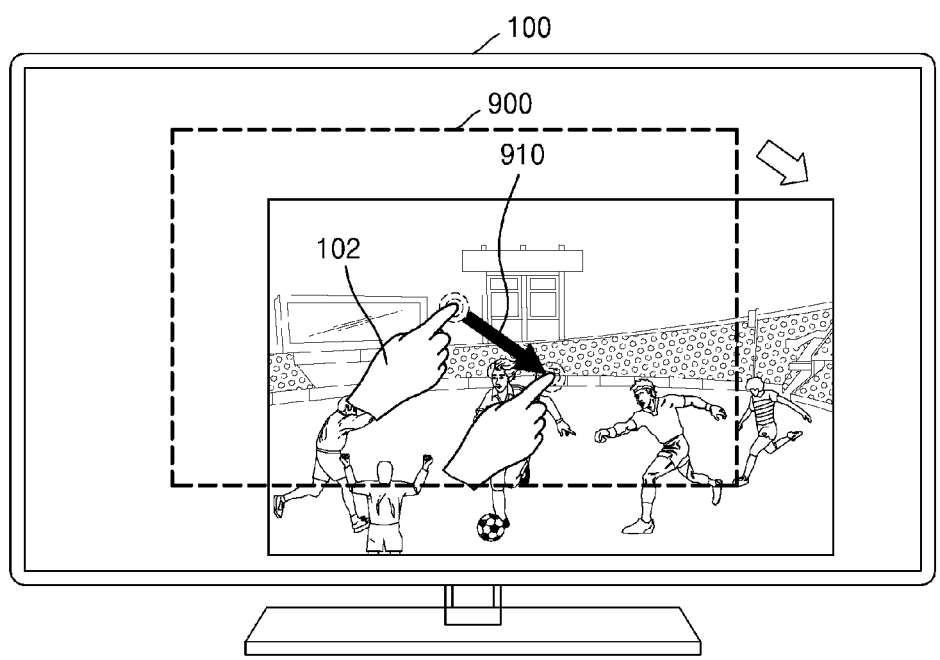
FIG. 9 is a diagram illustrating an example in which the electronic apparatus moves a captured image of a screen of an external device, according to an embodiment.

FIG. 9 is a diagram illustrating an example in which the electronic apparatus 100 moves a captured image of a screen of an external device, according to an embodiment.

The electronic apparatus 100 according to an embodiment may move and output drawing data and the captured image of the screen of the external device, in response to an input of moving a stored image.

Referring to FIG. 9, when a drawing input is completed, the electronic apparatus 100 may store drawing data and a captured image 900 of a screen of the external device. Also, the electronic apparatus 100 may receive a touch input of moving the stored captured image 900. For example, the electronic apparatus 100 may receive a touch input of dragging the stored captured image 900 in a certain direction using the finger 102. The electronic apparatus 100 may determine the received touch input as the touch input by the finger 102, based on a thickness of the touch input. When the electronic apparatus 100 recognizes that the touch input by the finger 102 indicates a certain trace 910, the electronic apparatus 100 may recognize the received touch input as an input of moving the stored captured image 900 and the drawing data. Accordingly, the electronic apparatus 100 may move both the stored captured image 900 and the drawing data.

Figure 10:
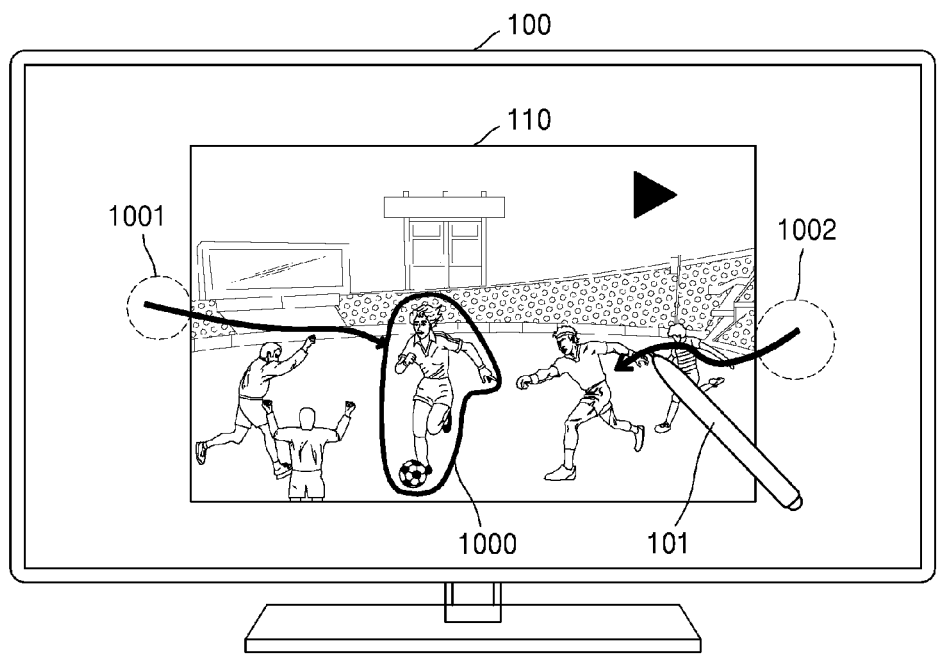
FIG. 10 is a diagram illustrating an example in which the electronic apparatus outputs drawing data outside the screen of the external device, according to an embodiment.

FIG. 10 is a diagram illustrating an example in which the electronic apparatus 100 outputs drawing data outside the screen 110 of the external device 50, according to an embodiment.

Referring to FIG. 10, the electronic apparatus 100 according to an embodiment may output the screen 110 of the external device 50 to the display 230 by mirroring the external device 50. When a received touch input is recognized as a drawing input, based on a thickness of the received touch input, the electronic apparatus 100 may output, to the display 230, drawing data 1000, 1001 and 1002 that correspond to the recognized drawing input. For example, as illustrated in FIG. 10, when a touch input of drawing a certain trace using the electronic pen 101 is received, the electronic apparatus 100 may recognize the received touch input as a drawing input. Drawing data 1001 and 1002 among the drawing data 1000, 1001 and 1002 output to the display 230 may be output outside a region of the display 230, the region corresponding to the screen 110 of the external device 50.

Also, the electronic apparatus 100 may store the drawing data 1000, 1001 and 1002 and a captured image of the screen 110 of the external device 50. In this regard, the drawing data 1000, 1001 and 1002 and the captured image of the screen 110 of the external device 50 may be stored as different files.

When an input of dragging a stored image in a certain direction is received, the electronic apparatus 100 may move both a stored captured image and drawing data. In this regard, the drawing data 1000 on the stored captured image may be moved together with the stored captured image, and the drawing data 1001 and 1002 output outside the region of the display 230, the region corresponding to the screen 110 of the external device 50, may not be moved.

Figure 11A:
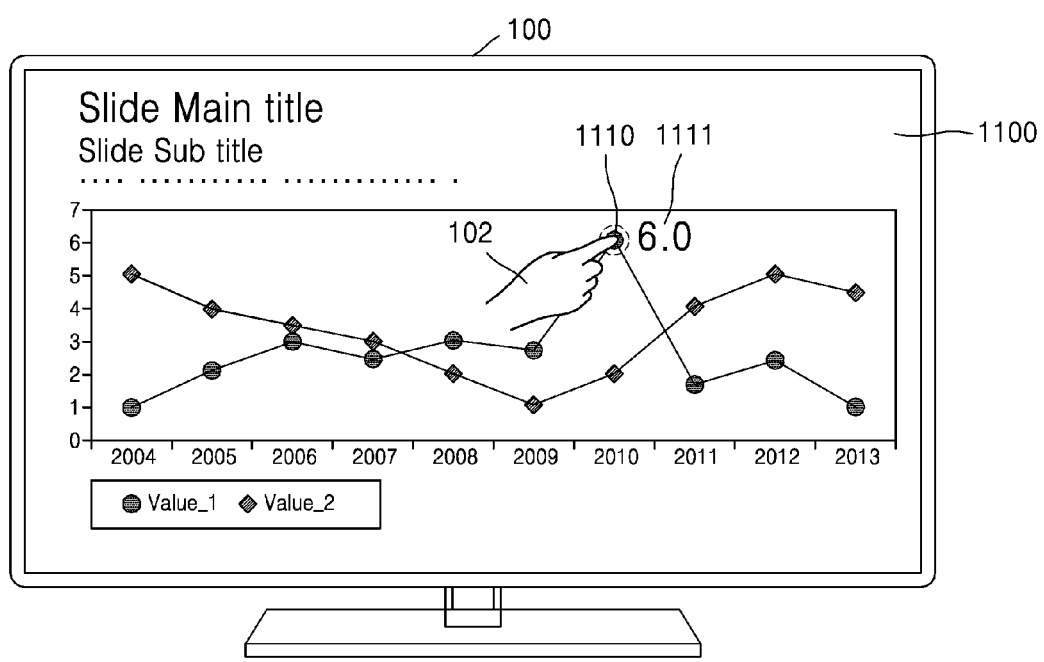
FIGS. 11A, 11B and 11C are diagrams illustrating an example in which the electronic apparatus outputs a screen of an external device to an entire region of the display, according to an embodiment.
Figure 11B:
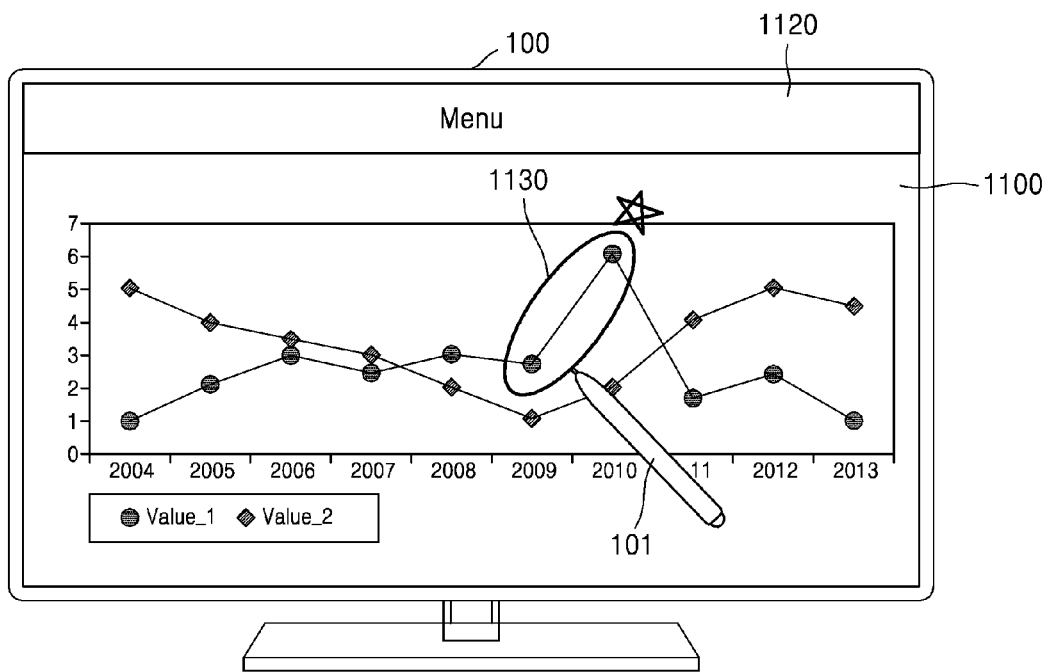
Figure 11C:
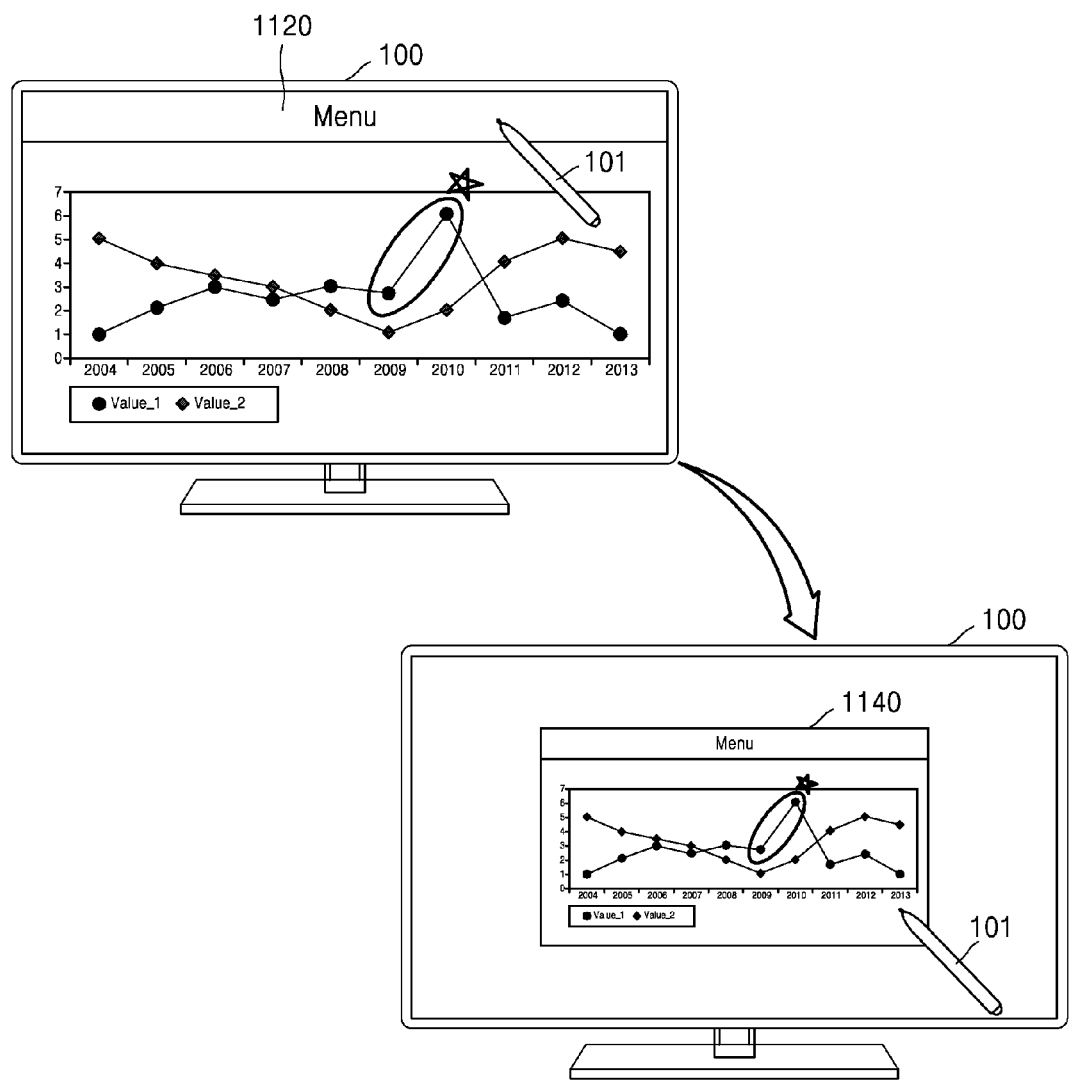

FIGS. 11A, 11B and 11C are diagrams illustrating an example in which the electronic apparatus 100 outputs a screen 1100 of an external device to an entire region of the display 230, according to an embodiment.

The electronic apparatus 100 according to an embodiment may output a screen of an external device mirrored in the electronic apparatus 100 to the entire region of the display 230. An input of selecting an icon or scrolling a page, the input being from among touch inputs received while the screen of the external device is output to the entire region of the display 230, may be an input for controlling the external device. For example, referring to FIG. 11A, the external device may execute a document file and may be mirrored in the electronic apparatus 100. Accordingly, the electronic apparatus 100 may output, to the display 230, the screen 1100 of the external device in which the document file is executed.

As illustrated in FIG. 11A, when an input of touching, using the finger 102, a point 1110 of a graph displayed on the screen 1100 of the external device is received, the electronic apparatus 100 may recognize the received touch input as an input of selecting an icon, based on a thickness of the touch input. When the screen 1100 of the external device is output to the entire region of the display 230, the input of selecting an icon may be an input for controlling the external device. For example, in response to an input of touching the point 1110 of the graph displayed on the screen 1100 of the external device, the electronic apparatus 100 may control the external device to display a value 1111 of the touched point 1110 on the screen 1100 of the external device.

Referring to FIG. 11B, a drawing input by the electronic pen 101 may be received while the screen 1100 of the external device is output to the entire region of the display 230. The electronic apparatus 100 may recognize a received touch input as the drawing input by the electronic pen 101, based on a thickness of the received touch input, and may output drawing data 1130 corresponding to the recognized drawing input to the display 230. When the drawing input is received, the electronic apparatus 100 may output a menu 1120 for outputting the screen 1100 of the external device from the entire region of the display 230 to at least a portion of the display 230. For example, as illustrated in FIG. 11B, the menu 1120 may be output to a top portion of the display 230, but the present disclosure is not limited thereto.

A touch input received while the screen 1100 of the external device is output to the entire region of the display 230 may be an input (e.g., an input of selecting an icon output to the screen 1100 of the external device) for controlling the external device or a drawing input. Thus, while the screen 1100 of the external device is output to the entire region of the display 230, to switch an output of the screen 1100 of the external device to an output to at least a portion of the display 230, there is a need for another input that is distinguished from the input for controlling the external device or the drawing input. Accordingly, when the screen 1100 of the external device is output to the entire region of the display 230, the electronic apparatus 100 may also output, to the display 230, the menu 1120 for outputting the screen 1100 of the external device to at least a portion of the display 230. Also, in response to an input of selecting the menu 1120 using the electronic pen 101, the electronic apparatus 100 may decrease and output the screen 1100 of the external device to at least the portion of the display 230.

Referring to FIG. 11C, the electronic apparatus 100 may receive a touch input by the electronic pen 101, and may recognize the received touch input as a drawing input, based on a thickness of the touch input. However, when an input of touching a menu using the electronic pen 101 is received, the electronic apparatus 100 may not recognize the received touch input as a drawing input but may recognize the received touch input as an input for switching an output of the screen 1100 of the external device to an output to at least a portion of the display 230. In response to the recognized input, the electronic apparatus 100 may decrease the screen 1100 of the external device to a screen 1140 of the external device and may output the screen 1140 to at least the portion of the display 230 from the entire region of the display 230. Accordingly, the electronic apparatus 100 may easily change a region of the display 230 from the entire region to at least the portion, wherein the screen 1100 of the external device is output to the region.

Figure 12:
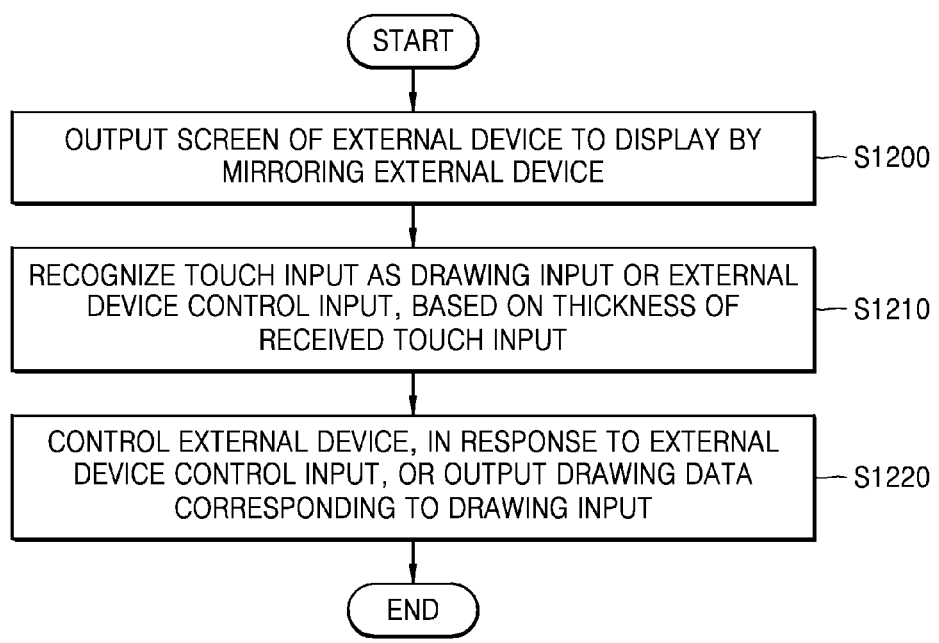
FIG. 12 is a flowchart illustrating an example method of operating the electronic apparatus, according to an embodiment.

FIG. 12 is a flowchart illustrating a method of operating the electronic apparatus 100, according to an embodiment.

In operation S1200, the electronic apparatus 100 according to an embodiment outputs a screen of an external device to the display 230 by mirroring the external device. The electronic apparatus 100 outputs the screen of the external device to the display 230, thereby allowing a user to easily control the external device via the screen of the external device which is output to the display 230.

In operation S1210, the electronic apparatus 100 according to an embodiment recognizes a received touch input as a drawing input or an external device control input, based on a thickness of the touch input.

The drawing input requires a relatively delicate input compared to the external device control input, therefore, a thickness of the drawing input may be relatively less than a thickness of the external device control input. The electronic apparatus 100 may recognize the touch input as the drawing input or the external device control input, based on the thickness of the touch input, thereby easily changing a type of the touch input without an additional operation for changing the type of the recognized touch input.

The electronic apparatus 100 according to an embodiment may measure the thickness of the received touch input, and when the measured thickness of the touch input corresponds to a first threshold range, may recognize the touch input as the drawing input. Also, when the measured thickness of the touch input corresponds to a second threshold range, the electronic apparatus 100 may recognize the touch input as the external device control input. The first threshold range and the second threshold range may vary according to internal settings of the electronic apparatus 100 or may vary according to settings by a user.

The electronic apparatus 100 according to an embodiment may determine a touch input as a touch input by the electronic pen 101 or a touch input by a finger, based on a thickness of the touch input. For example, a thickness of the touch input by the finger of the user may be greater than a thickness of the touch input by the electronic pen 101. Accordingly, the electronic apparatus 100 may measure the thickness of the touch input, and when the measured thickness of the touch input is equal to or greater than a threshold value, the processor 220 may determine the touch input as the touch input by the finger, and when the measured thickness of the touch input is less than the threshold value, the processor 220 may determine the touch input as the touch input by the electronic pen 101.

Also, when the electronic apparatus 100 determines the touch input as the touch input by the electronic pen 101, the electronic apparatus 100 may recognize the touch input as the drawing input, and when the electronic apparatus 100 determines the touch input as the touch input by the finger, the electronic apparatus 100 may recognize the touch input as the external device control input.

In operation S1220, the electronic apparatus 100 may control the external device, in response to the external device control input, or may output the drawing input to the display 230.

The electronic apparatus 100 according to an embodiment may output drawing data to a region of the display 230, the region corresponding to the screen of the external device. For example, the drawing data may be displayed only on the region of the display 230 which corresponds to the screen of the external device, or, in another embodiment, the drawing data may be output outside the region of the display 230 which corresponds to the screen of the external device.

When the drawing input is completed, the electronic apparatus 100 according to an embodiment may store a captured image of the screen of the external device and the drawing data. The captured image of the screen of the external device and the drawing data may be stored as different files, and only the drawing data may be deleted according to selection by the user.

The electronic apparatus 100 according to an embodiment may move both the stored captured image and the drawing data, in response to an external input of moving the stored captured image.

The electronic apparatus 100 according to an embodiment may output the screen of the external device to an entire region of the display 230, and when a drawing input is received, the electronic apparatus 100 may display, on the display 230, a menu for outputting the screen of the external device to at least a portion of the display 230. Also, in response to an input of selecting the displayed menu using the electronic pen 101, the electronic apparatus 100 may control the display 230 to decrease and output the screen of the external device from the entire region to at least the portion of the display 230.

According to the embodiments, types of touch inputs may be differently recognized based on thicknesses of the received touch inputs, without an additional operation of changing a type of a touch input, and an external device may be controlled or a drawing input may be output to a display, based on a type of a recognized touch input. Therefore, a user may conveniently experience a drawing operation and a control of an external device, without a need to change a device mode depending on a type of a touch input.

Some embodiments may be embodied as a computer-readable recording medium that includes computer-readable instructions such as a program module to be executed in computers. The computer-readable recording medium may include any usable medium that may be accessed by computers, volatile and non-volatile medium, and detachable and non-detachable medium. Also, the computer-readable recording medium may include a computer storage medium and a communication medium. The computer storage medium includes all volatile and non-volatile media, and detachable and non-detachable media which are technically implemented to store information including computer-readable instructions, data structures, program modules or other data. The communication medium includes computer-readable instructions, a data structure, a program module, other data as modulation-type data signals such as carrier signals, or other transmission mechanism, and includes other information transmission media.

Throughout the disclosure, the term "unit" may indicate a hardware component such as a processor or a circuit, and/or may indicate a software component that is executed by a hardware configuration such as a processor.

It will be apparent to one of ordinary skill in the art that the disclosure may be easily embodied in many different forms without changing the technical concept or essential features of the disclosure. Thus, it should be understood that the various example embodiments described herein should be considered in a descriptive sense only and not for purposes of limitation. For example, configuring elements that are singular forms may be executed in a distributed fashion, and also, configuring elements that are distributed may be combined and then executed.

While various example embodiments have been described with reference to the figures, it will be understood by one of ordinary skill in the art that various changes in form and details may be made therein without departing from the spirit and scope as defined, for example, by the following claims.

What is claimed is:

1. An electronic apparatus comprising:
   a display;
   a touch input interface configured to receive a touch input;
   a memory configured to store one or more instructions; and
   a processor configured to execute the one or more instructions stored in the memory, wherein the processor is configured to execute the one or more instructions to:
   control the display to output a screen of an external device to at least a portion of the display by mirroring the external device,
   recognize the touch input as a drawing input or an external device control input based on a surface area of the touch input received using the touch input interface, wherein the external device control input is for controlling the external device via the screen of the external device output to the at least the portion of the display,
   control the display to output drawing data corresponding to the drawing input, based on the touch input being recognized as the drawing input, and
   control the external device according to the touch input, based on the touch input being recognized as the external device control input.

2. The electronic apparatus of claim 1, wherein the processor is further configured to execute the one or more instructions to:
   identify the surface area of the touch input,
   recognize the touch input as the drawing input based on that the surface area of the touch input corresponds to a first threshold range, and
   recognize the touch input as the external device control input based on that the surface area of the touch input corresponds to a second threshold range.

3. The electronic apparatus of claim 1, wherein the processor is further configured to execute the one or more instructions to:
   identify the touch input as one of a touch input by an electronic pen and a touch input by a finger, based on the surface area of the touch input,
   recognize the touch input as the drawing input based on that the touch input is identified as the touch input by the electronic pen, and
   recognize the touch input as the external device control input based on that the touch input is identified as the touch input by the finger.

4. The electronic apparatus of claim 1, wherein the processor is further configured to execute the one or more instructions to output the drawing data to a region of the display, the region corresponding to the screen of the external device.

5. The electronic apparatus of claim 1, wherein the processor is further configured to execute the one or more instructions to control the electronic apparatus to store the drawing data and a captured image of the screen of the external device when the drawing input is completed.

6. The electronic apparatus of claim 5, wherein the processor is further configured to execute the one or more instructions to control the display to move and output the drawing data and the stored captured image in response to receiving an external device control input of moving the stored captured image.

7. The electronic apparatus of claim 6, wherein the processor is further configured to execute the one or more instructions to control the display to move and output the stored captured image and the drawing data from among a plurality of items of drawing data output to the display and positioned in a region of the display, the region corresponding to the screen of the external device.

8. The electronic apparatus of claim 1, wherein the processor is further configured to execute the one or more instructions to:
   identify a surface area of the touch input, in response to a touch input of touching the drawing input being output to the display,
   recognize the touch input as an input of deleting the drawing input, based on that the surface area of the touch input corresponds to a third threshold value, and
   delete the drawing data, in response to the recognized input.

9. The electronic apparatus of claim 1, wherein the processor is further configured to execute the one or more instructions to:
   control the display to output the screen of the external device to an entire region of the display,
   control the display to display a menu for outputting the screen of the external device to a portion of the display based on that the drawing input is received, and control the display to decrease and output the screen of the external device from the entire region of the display to the portion of the display in response to an input of selecting the menu.

10. The electronic apparatus of claim 9, wherein the processor is further configured to execute the one or more instructions to recognize, as the input of selecting the menu, a touch input of touching a region displaying the menu of the display using an electronic pen.

11. A method of operating an electronic apparatus, the method comprising:
outputting a screen of an external device to at least a portion of a display of the electronic apparatus by mirroring the external device;
receiving a touch input via the screen of the external device output to the at least the portion of the display;
recognizing the touch input as a drawing input or an external device control input, based on a surface area of the touch input;
outputting drawing data corresponding to the drawing input based on that the touch input is recognized as the drawing input; and
controlling the external device according to the touch input based on that the touch input is recognized as the external device control input.

12. The method of claim 11, wherein the recognizing comprises:
identifying the surface area of the touch input;
recognizing the touch input as the drawing input based on that the measured surface area of the touch input corresponds to a first threshold range; and
recognizing the touch input as the external device control input based on that the measured surface area of the touch input corresponds to a second threshold range.

13. The method of claim 11, wherein the recognizing comprises:
identifying the touch input as one of a touch input by an electronic pen and a touch input by a finger based on the surface area of the touch input;
recognizing the touch input as the drawing input based on that the touch input is identified as the touch input by the electronic pen; and
recognizing the touch input as the external device control input based on that the touch input is identified as the touch input by the finger.

14. The method of claim 11, wherein the outputting of the drawing data comprises outputting the drawing data to a region of the display, the region corresponding to the screen of the external device.

15. The method of claim 11, further comprising, storing the drawing data and a captured image of the screen of the external device based on that the drawing input is completed.

16. The method of claim 15, further comprising moving and outputting the drawing data and the stored captured image in response to an external input of moving the stored captured image.

17. The method of claim 16, wherein the moving and outputting comprises moving and outputting the stored captured image and the drawing data from among a plurality of items of drawing data output to the display and positioned in a region of the display, the region corresponding to the screen of the external device.

18. The method of claim 11, further comprising:
identifying a surface area of the touch input in response to a touch input of touching the drawing input being output to the display;
recognizing the touch input as an input of deleting the drawing input based on that the surface area of the touch input corresponds to a third threshold value; and
deleting the drawing data in response to the recognized input.

19. The method of claim 11, wherein the outputting of the screen of the external device comprises:
outputting the screen of the external device to an entire region of the display;
displaying a menu for outputting the screen of the external device to a portion of the display based on that the drawing input is received; and
decreasing and outputting the screen of the external device from the entire region of the display to the portion of the display in response to an input of selecting the menu.

20. A non-transitory computer-readable recording medium having recorded thereon a program, by at least one circuit in an electronic apparatus, configured to cause the at least one circuit to perform at least one operation, the at least one operation comprising:
outputting a screen of an external device to at least a portion of a display of the electronic apparatus by mirroring the external device;
receiving a touch input via the screen of the external device output to the at least the portion of the display;
recognizing the touch input as a drawing input or an external device control input, based on a surface area of the touch input;
outputting drawing data corresponding to the drawing input when the touch input is recognized as the drawing input; and
controlling the external device based on the touch input when the touch input is recognized as the external device control input.

* * * * *